(12) United States Patent
Dwivedi et al.

(10) Patent No.: US 10,815,073 B1
(45) Date of Patent: Oct. 27, 2020

(54) ITEM SINGULATION SYSTEMS USING TURN CONVEYORS

(71) Applicant: Amazon Technologies, Inc., Seattle, WA (US)

(72) Inventors: Rajeev Dwivedi, Sammamish, WA (US); Mohit Malik, Seattle, WA (US); Vivek S. Narayanan, Sammamish, WA (US); Shahid Azad, Seattle, WA (US); Ganesh Krishnamoorthy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/681,457

(22) Filed: Nov. 12, 2019

(51) Int. Cl.
*B65G 47/68* (2006.01)
*B65G 15/22* (2006.01)

(52) U.S. Cl.
CPC ........... *B65G 47/682* (2013.01); *B65G 15/22* (2013.01)

(58) Field of Classification Search
CPC .... B65G 47/082; B65G 47/682; B65G 15/02; B65G 15/22
See application file for complete search history.

(56) References Cited

U.S. PATENT DOCUMENTS

| | | | | |
|---|---|---|---|---|
| 5,439,098 A * | 8/1995 | Bonnet | .................. | B65G 15/02 198/831 |
| 5,487,461 A * | 1/1996 | Focke | .................. | B65G 47/082 198/432 |
| 7,861,847 B2 * | 1/2011 | Fourney | ................. | B65G 17/24 198/419.2 |

\* cited by examiner

*Primary Examiner* — William R Harp
(74) *Attorney, Agent, or Firm* — Athorus, PLLC

(57) ABSTRACT

Item singulation systems and methods may include an input conveyor, a separation conveyor, a turn conveyor, and an output conveyor that is positioned parallel with the input conveyor. A vision system may determine individual columns of items from among a plurality of items on the input conveyor. Operations of the input conveyor, separation conveyor, turn conveyor, and output conveyor may be controlled substantially as a pull system to transfer individual columns of items to the output conveyor, such that singulated items can be transferred by the output conveyor to downstream processes.

20 Claims, 13 Drawing Sheets

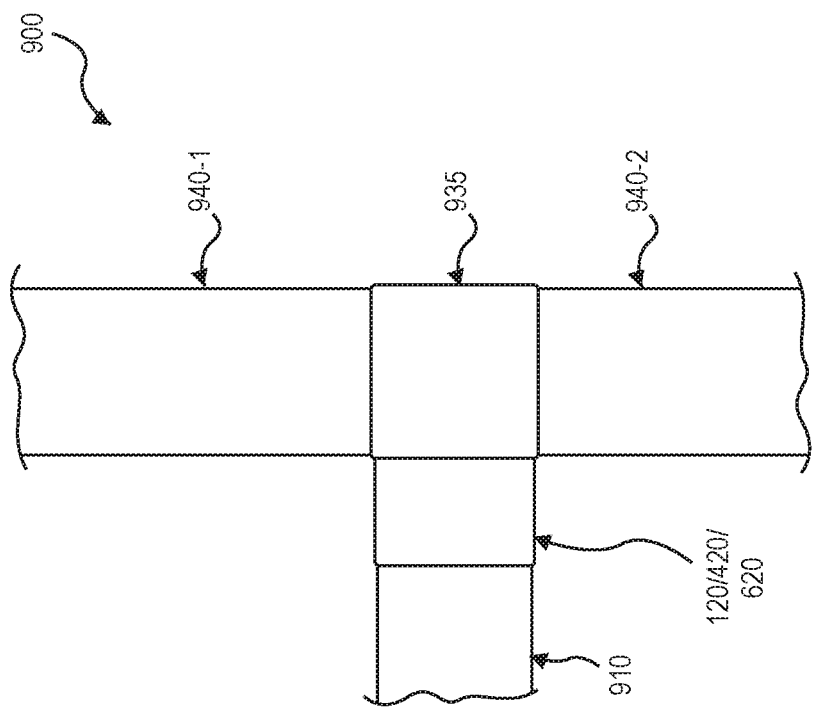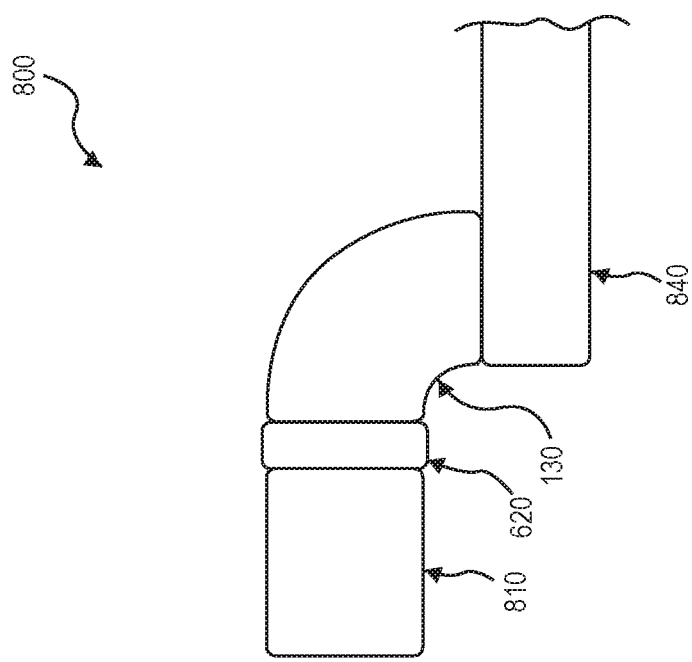

ITEM SINGULATION SYSTEMS USING TURN CONVEYORS

CROSS-REFERENCE TO RELATED APPLICATIONS

This application is related to U.S. application Ser. No. 16/369,431 filed Mar. 29, 2019, entitled "Item Singulation System and Method," and U.S. application Ser. No. 16/369,493, filed Mar. 29, 2019, entitled "System and Method for Collimating Items," the contents of which are herein incorporated by reference in their entirety.

BACKGROUND

Many companies may receive, store, package, and ship items and/or groups of items from material handling facilities. For example, many companies may receive and store items in a material handling facility and ship items to various destinations (e.g., customers, stores) from the material handling facility. Receipt of items in the material handling facility, storage of items within the material handling facility, shipping of items from the material handling facility, and the overall flow or movement of items within the material handling facility (e.g., from receive to storage to shipping) often incurs significant cost and time. Accordingly, there is a need for automated systems and methods to facilitate receive, sortation, storage, shipping, and other processes within a material handling facility, thereby improving the efficiency of such processes.

BRIEF DESCRIPTION OF THE DRAWINGS

FIG. 8 is a schematic, overhead view diagram of an example item singulation system using a separation slide and a turn conveyor, in accordance with implementations of the present disclosure.

FIG. 9 is a schematic, overhead view diagram of an example item singulation system using a separation conveyor or slide, a bidirectional conveyor segment, and two orthogonal conveyors, in accordance with implementations of the present disclosure.

DETAILED DESCRIPTION

Figure 1A:
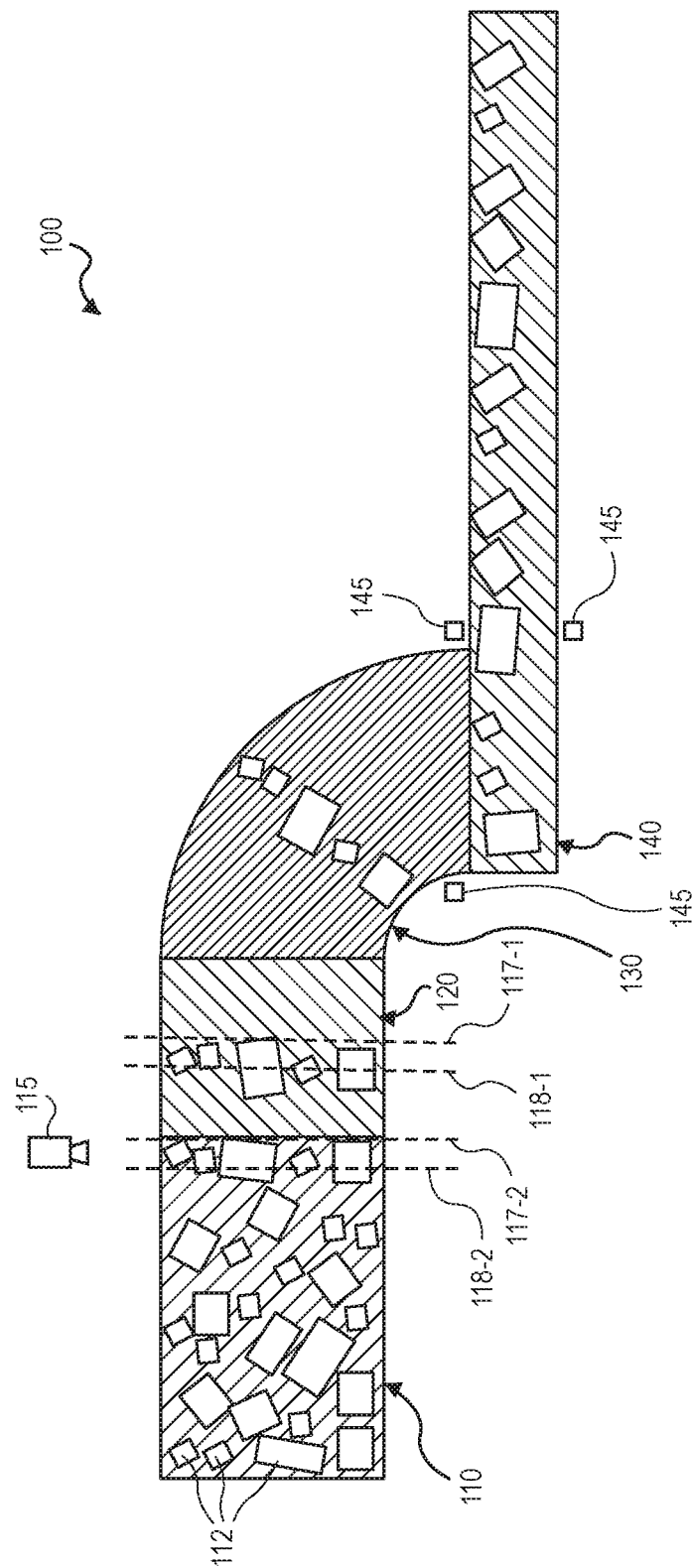
FIG. 1A is a schematic, overhead view diagram of an example item singulation system using a turn conveyor, in accordance with implementations of the present disclosure.

As is set forth in greater detail below, implementations of the present disclosure are directed to item singulation systems and methods to identify, separate, and singulate items using a plurality of conveyance mechanisms for various downstream processes, such as sortation, storage, packing, shipping, or other processes.

In example embodiments, an item singulation system may comprise an input conveyor configured to receive a plurality of items, a vision system configured to determine columns of items from the plurality of items on the input conveyor, a separation conveyor configured to separate columns of items from each other, a turn conveyor configured to rotate the columns of items, and an output conveyor configured to receive the columns of items and transfer the singulated items to various downstream processes.

The plurality of items may comprise packages, boxes, containers, items, or other types of objects that may be received, identified, separated, singulated, and transferred to various downstream processes. The vision system may determine individual columns of items in order to separate and singulate the columns of items from each other. The turn conveyor may rotate the columns of items various amounts, e.g., approximately 45 degrees, approximately 90 degrees, or other amounts. For example, the turn conveyor may rotate the columns of items approximately 90 degrees, and a direction of movement of the output conveyor may be approximately parallel to a direction of movement of the input conveyor. Further, a controller may control operations and actuations of the various components of the item singulation system based at least in part on data from the vision system, e.g., the controller may actuate the various conveyors as a pull system starting from the output conveyor to each of the turn conveyor, separation conveyor, and input conveyor.

In other example embodiments, an item singulation system may comprise an input conveyor configured to receive a plurality of items, a vision system configured to determine columns of items from the plurality of items on the input conveyor, a separation conveyor configured to separate columns of items from each other, and an output conveyor configured to receive the columns of items and transfer the singulated items to various downstream processes.

The plurality of items may comprise packages, boxes, containers, items, or other types of objects that may be received, identified, separated, singulated, and transferred to various downstream processes. The vision system may determine individual columns of items in order to separate and singulate the columns of items from each other. The output conveyor may be positioned at an angle to the separation conveyor, e.g., approximately rotated 90 degrees with respect to the separation conveyor. For example, a direction of movement of the output conveyor may be approximately orthogonal to a direction of movement of the input conveyor and separation conveyor. Further, a controller may control operations and actuations of the various components of the item singulation system based at least in part on data from the vision system, e.g., the controller may actuate the various conveyors as a pull system starting from the output conveyor to each of the separation conveyor and input conveyor.

In further example embodiments, an item singulation system may comprise an input conveyor configured to receive a plurality of items, a separation slide configured to separate columns of items from each other, and an output conveyor configured to receive the columns of items and transfer the singulated items to various downstream processes.

The plurality of items may comprise packages, boxes, containers, items, or other types of objects that may be received, separated, singulated, and transferred to various downstream processes. One or more portions of the input conveyor may mechanically separate and singulate individual columns of items from each other. The output conveyor may be positioned at an angle to the separation slide, e.g., approximately rotated 90 degrees with respect to the separation slide. For example, a direction of movement of the output conveyor may be approximately orthogonal to a direction of movement of the input conveyor and a direction of movement of items along the separation slide. Further, a controller may control operations and actuations of the various components of the item singulation system, e.g., the controller may actuate the various conveyors as a pull system starting from the output conveyor to the input conveyor.

In still further example embodiments, an item singulation system may comprise various combinations of input conveyors, separation conveyors, separation slides, turn conveyors, output conveyors, and/or other conveyance segments, mechanisms, or apparatus. In one example, an item singulation system may comprise an input conveyor, a separation slide, a turn conveyor, and an output conveyor. In another example, an item singulation system may comprise an input conveyor, a separation conveyor or slide, a bidirectional conveyor segment, and two output conveyors. In a further example, an item singulation system may comprise an input conveyor, a separation conveyor or slide, an omnidirectional conveyor segment, a turn conveyor, and three output conveyors. Various other combinations may also be used to form other example item singulation systems.

Using the example item singulation systems and methods described herein, a plurality of items received by an input conveyor may be identified, separated, singulated, and transferred to various downstream processes, e.g., by transferring a single file, line, or column of items to an output conveyor that then transfers the singulated items to various downstream processes.

Figure 1B:
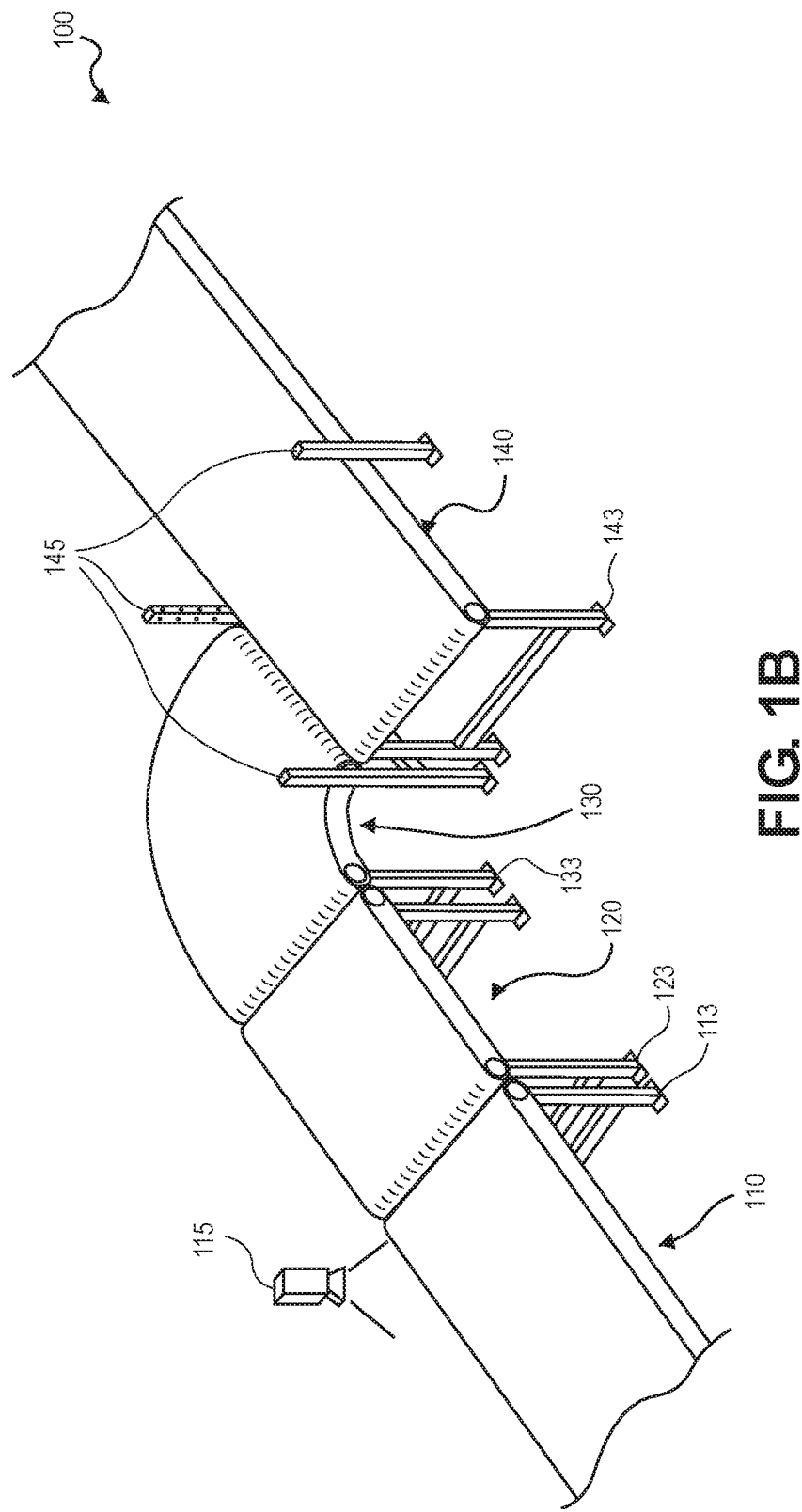
FIG. 1B is a schematic, perspective view diagram of an example item singulation system using a turn conveyor, in accordance with implementations of the present disclosure.

FIG. 1A is a schematic, overhead view diagram of an example item singulation system 100 using a turn conveyor, in accordance with implementations of the present disclosure, and FIG. 1B is a schematic, perspective view diagram of an example item singulation system 100 using a turn conveyor, in accordance with implementations of the present disclosure.

The example item singulation system 100 may include an input conveyor 110, a vision system 115, a separation conveyor 120, a turn conveyor 130, and an output conveyor 140. Various downstream processes may receive singulated items from the output conveyor 140, the output conveyor 140 may receive individual columns of items from the turn conveyor 130, the turn conveyor 130 may receive individual columns of items from the separation conveyor 120, the separation conveyor 120 may receive individual columns of items from the input conveyor 110, the input conveyor 110 may receive a plurality of items from various upstream processes, and the various upstream processes may destack and/or deshingle the plurality of items such that a single or flat layer of items is transferred to the input conveyor 110, as described for example in U.S. application Ser. Nos. 16/369,431 and 16/369,493, the contents of which are herein incorporated by reference in their entirety. As described herein, a column of items may comprise a single file or line of items that extends substantially transverse to a direction of movement of the input conveyor 110, and that extends substantially parallel to a direction of movement of the output conveyor 140 upon transfer to the output conveyor 140.

The input conveyor 110 may comprise a frame 113 and one or more rollers, belts, or other conveyance mechanisms, the separation conveyor 120 may comprise a frame 123 and one or more rollers, belts, or other conveyance mechanisms, the turn conveyor 130 may comprise a frame 133 and one or more rollers, belts, or other conveyance mechanisms, and the output conveyor 140 may comprise a frame 143 and one or more rollers, belts, or other conveyance mechanisms. The frames 113, 123, 133, 143 may be formed of various materials such as metals, composites, plastics, other materials, or combinations thereof. In addition, one or more of the input conveyor 110, the separation conveyor 120, the turn conveyor 130, and/or the output conveyor 140 may include various guards, rails, plates, or other structural elements to prevent items from falling off the sides or edges of the conveyors.

Each of the input conveyor 110, separation conveyor 120, turn conveyor 130, and output conveyor 140 may be configured to stop, start, and rotate or actuate at various speeds to receive and transfer items. In addition, during transfer of items from the input conveyor 110 to the separation conveyor 120, the input conveyor 110 and separation conveyor 120 may rotate at substantially the same speed. Further, during transfer of items from the separation conveyor 120 to the turn conveyor 130, the separation conveyor 120 and turn conveyor 130 may rotate at substantially the same speed. Moreover, during transfer of items from the turn conveyor 130 to the output conveyor 140, the turn conveyor 130 may rotate at a first speed, and the output conveyor 140 may rotate at a second speed, e.g., may be stopped or not rotate, or may rotate at a second speed that is the same as, faster than, or slower than the first speed.

In addition, the turn conveyor 130 may be configured to rotate items by a defined angle or amount between receipt of the items from the separation conveyor 120 and transfer of the items to the output conveyor 140. For example, the turn conveyor 130 may rotate items by approximately 90 degrees, such that a direction of movement of the output conveyor 140 is approximately parallel to a direction of movement of the input conveyor 110. In other example embodiments, the turn conveyor 130 may rotate items by different angles, e.g., approximately 30 degrees, approximately 45 degrees, approximately 60 degrees, or other angles or amounts.

In example embodiments, the vision system 115 may comprise one or more cameras, imaging sensors, depth sensors, infrared sensors, or other imaging devices that are positioned overhead, to the side, or at other positions relative to the input conveyor 110, and the vision system 115 may be configured to capture imaging data of a plurality of items 112 received by the input conveyor 110. The imaging data captured by the vision system 115 may be processed to determine one or more lines, edges, corners, surfaces, or other features of the plurality of items 112 on the input conveyor 110, e.g., using various image recognition or image processing techniques or algorithms.

Further, the imaging data captured by the vision system 115 may be processed to determine individual columns of items based at least in part on the determined lines, edges, corners, surfaces, or other features of the plurality of items 112. For example, a first leading edge 117 of a column of items may be determined based at least in part on determined features of the plurality of items 112. As shown in FIG. 1A, the first leading edge may comprise a first leading edge 117-1 of a first item of an individual column of items that has previously been transferred from the input conveyor 110 to the separation conveyor 120. Likewise, the first leading edge may comprise a first leading edge 117-2 of another first item of an individual column of items that is to be transferred from the input conveyor 110 to the separation conveyor 120.

In addition, responsive to determining a first leading edge 117 of a column of items, a first trailing edge 118 of the column of items may be determined based at least in part on determined features of the plurality of items 112. In example embodiments, the first trailing edge 118 may comprise a first trailing edge of any item that is identified after identifying a first leading edge of a first item in an individual column of items. In other example embodiments, the first trailing edge 118 may comprise a first trailing edge of a smallest or shortest item that is identified after identifying a first leading edge of a first item in an individual column of items. As shown in FIG. 1A, the first trailing edge may comprise a first trailing edge 118-1 of any item or a smallest or shortest item of an individual column of items that has previously been transferred from the input conveyor 110 to the separation conveyor 120. Likewise, the first trailing edge may comprise a first trailing edge 118-2 of any item or a smallest or shortest item of an individual column of items that is to be transferred from the input conveyor 110 to the separation conveyor 120.

In this manner, imaging data from the vision system 115 may be processed to determine individual columns of items that each comprises a single file or line of items that extends substantially transverse to a direction of movement of the input conveyor 110 and that may be transferred from the input conveyor 110 to the separation conveyor 120. As a result, the individual columns of items may be transferred to the output conveyor 140, e.g., via the separation conveyor 120 and turn conveyor 130, such that a single file or line of items extends substantially parallel to a direction of movement of the output conveyor 140.

As described herein, adjacent conveyors may be rotated at substantially a same speed during transfer of a column of items between adjacent conveyors, in order to maintain the column of items as a single file or line of items. When a column of items is moved by a conveyor but is not transferred between adjacent conveyors, each of the conveyors may rotate at various speeds and/or may start and stop rotation, e.g., to alter or adjust spacing between individual columns of items.

Further, the operations of the example item singulation system may be controlled substantially as a pull system, e.g., by a controller or control system as further described herein. For example, the output conveyor 140 may be actuated to transfer singulated items to various downstream processes. In addition, the output conveyor 140 may be selectively actuated to alter or adjust spacing between individual columns of items received from the turn conveyor 130. Upon determining that a column of items is to be transferred from the turn conveyor 130 to the output conveyor 140, e.g., to a transfer zone of the output conveyor 140 that is adjacent the turn conveyor 130, the turn conveyor 130 may be actuated to transfer a column of items to the transfer zone of the output conveyor 140.

In some example embodiments, one or more sensors 145 may be associated with the output conveyor 140, e.g., one or more boundaries, edges, or portions of a transfer zone of the output conveyor 140. The one or more sensors 145 may comprise cameras, imaging sensors, imaging devices, depth sensors, infrared sensors, photoeyes, light curtains, proximity sensors, or other types of sensors. For example, the one or more sensors 145 may detect that no objects are present in the transfer zone of the output conveyor 140, and/or that all objects have moved downstream and out of the transfer zone of the output conveyor 140, in order to determine that a column of items is to be transferred from the turn conveyor 130 to the output conveyor 140. In addition, the one or more sensors 145 may detect that one or more objects are present in the transfer zone of the output conveyor 140, and/or that one or more objects have moved downstream and into the transfer zone of the output conveyor 140, in order to determine that a column of items has been transferred from the turn conveyor 130 to the output conveyor 140. Other conveyors or portions thereof of the example item singulation system, e.g., the turn conveyor 130, the separation conveyor 120, and/or the input conveyor 110, may also include one or more sensors, similar to the one or more sensors 145 described with reference to the output conveyor 140, to control actuations of the other conveyors and corresponding transfers of items between conveyors.

Continuing with the operations of the example item singulation system that may be controlled substantially as a pull system, upon determining that a column of items is to be transferred from the turn conveyor 130 to the output conveyor 140, e.g., to a transfer zone of the output conveyor 140 that is adjacent the turn conveyor 130, the separation conveyor 120 may also be actuated with the turn conveyor 130 to transfer a column of items to the transfer zone of the output conveyor 140 via the turn conveyor 130. Further, if it is determined that no objects are present on the separation conveyor 120, or that no objects are present on either of the turn conveyor 130 or the separation conveyor 120, the input conveyor 110 may be actuated to transfer a column of items from the input conveyor 110 to the separation conveyor 120 based at least in part on the data from the vision system 115, which column of items will subsequently be transferred to the transfer zone of the output conveyor 140 via the turn conveyor 130. After transferring the column of items from the input conveyor 110 to the separation conveyor 120 based at least in part on the data from the vision system 115, the input conveyor 110 may be stopped until it is subsequently determined that a next column of items is to be transferred from the input conveyor 110 to the separation conveyor 120.

By operating the example item singulation system substantially as a pull system, a substantially continuous, single file or line of items may be transferred to the output conveyor 140, by selective actuations of the output conveyor 140, turn conveyor 130, separation conveyor 120, and/or input conveyor 110 such that individual columns of items are identified, separated, and singulated for various downstream processes.

Although example embodiments described herein refer to one or more sensors 145 that may be used to control operations of the example item singulation system substantially as a pull system, in other example embodiments, actuations of one or more conveyors may be controlled on the basis of an amount, degree, or distance of movement of the one or more conveyors that may be determined based on feedback or data associated with actuators or other portions of the one or more conveyors, e.g., using data from motor or actuator encoders, data associated with times or durations of operation, and/or other data or measurements related to operational times or traveled distances of one or more objects on the one or more conveyors.

Figure 2:
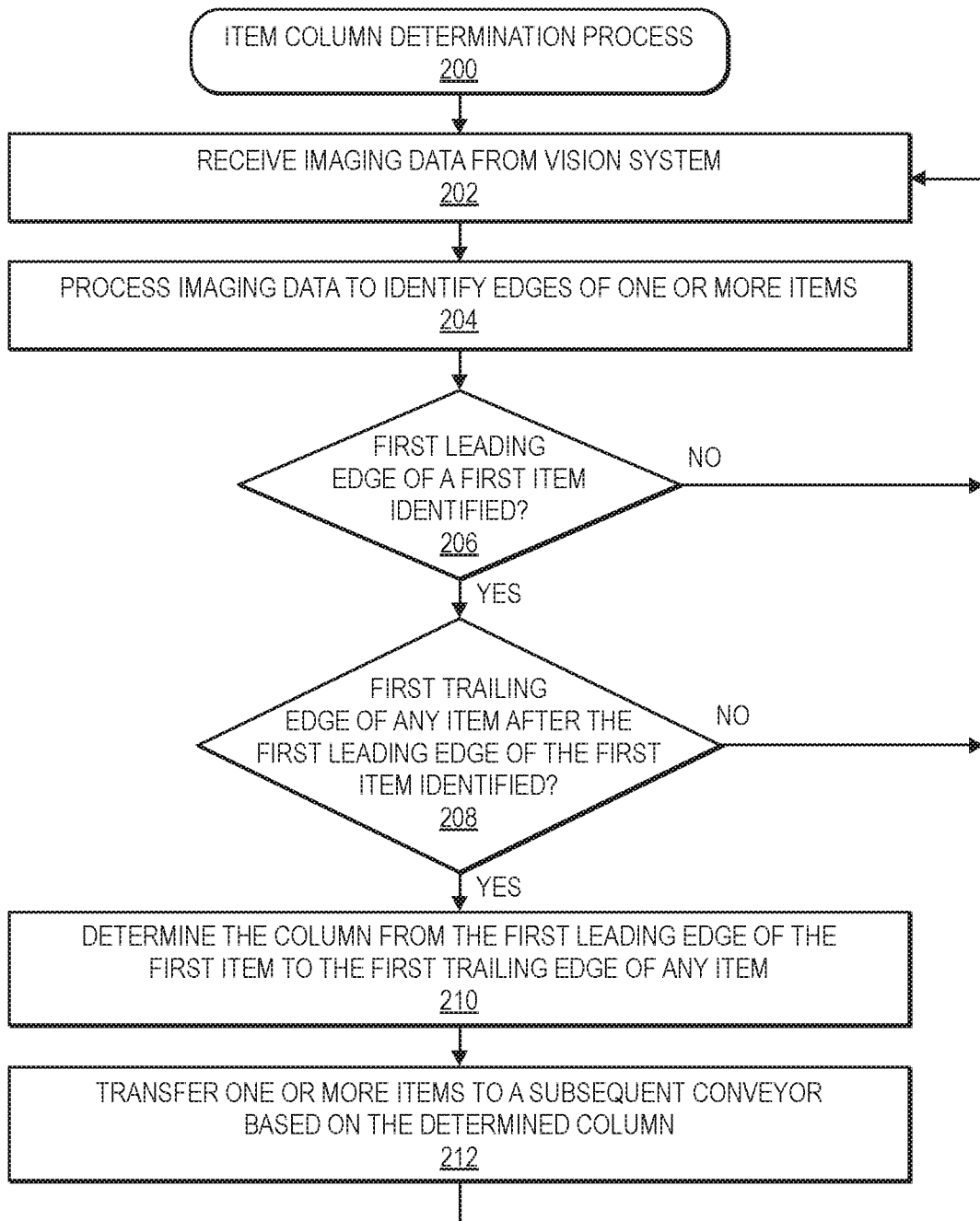
FIG. 2 is a flow diagram illustrating an example item column determination process, in accordance with implementations of the present disclosure.

FIG. 2 is a flow diagram illustrating an example item column determination process 200, in accordance with implementations of the present disclosure.

The process 200 may begin by receiving imaging data from a vision system, as at 202. For example, one or more cameras, imaging sensors, depth sensors, infrared sensors, or other imaging devices may capture imaging data of a plurality of items received by an input conveyor. In addition, a controller may receive the imaging data captured by the one or more imaging devices.

The process 200 may continue by processing the imaging data to identify edges of one or more items, as at 204. For example, the imaging data may be processed to identify one or more lines, edges, corners, surfaces, or other features of the plurality of items on the input conveyor in order to determine a column of items on the input conveyor. In addition, a controller may process the imaging data, e.g., using various image recognition or image processing techniques or algorithms, to identify one or more lines, edges, corners, surfaces, or other features of the plurality of items.

The process 200 may proceed by determining whether a first leading edge of a first item is identified, as at 206. For example, relative to a direction of movement of the input conveyor, it may be determined whether a first leading edge of a first item in a column of items is identified. In addition, a controller may determine whether a first leading edge of a first item is identified based at least in part on the processing of the imaging data. If a first leading edge of a first item is not yet identified, then the process 200 may return to step 202 to continue to receive imaging data and process the imaging data to identify one or more lines, edges, corners, surfaces, or other features of the plurality of items on the input conveyor.

If, however, a first leading edge of a first item is identified, then the process 200 may continue to determine whether a first trailing edge of any item after the first leading edge of the first item is identified, as at 208. For example, relative to a direction of movement of the input conveyor and responsive to identifying a first leading edge of a first item in a column of items, it may be determined whether a first trailing edge of any item or a smallest or shortest item of the column of items is identified. In addition, a controller may determine whether a first trailing edge of any item or a smallest or shortest item is identified based at least in part on the processing of the imaging data. If a first trailing edge of any item is not yet identified, then the process 200 may return to step 202 to continue to receive imaging data and process the imaging data to identify one or more lines, edges, corners, surfaces, or other features of the plurality of items on the input conveyor.

If, however, a first trailing edge of any item is identified, then the process 200 may proceed to determine the column of items from the first leading edge of the first item to the first trailing edge of any item, as at 210. For example, the column of items may be determined between the first leading edge of the first item and the first trailing edge of any item or a smallest or shortest item, and the column of items may comprise a single file or line of items that extends substantially transverse to a direction of movement of the input conveyor. In this manner, the column of items may be determined such that no two items within the column of items are positioned adjacent each other along a direction of movement of the input conveyor, such that all items of the column of items may be singulated from each other upon transfer to the output conveyor. In addition, a controller may determine the column of items from the first leading edge of the first item to the first trailing edge of any item based at least in part on the processing of the imaging data.

The process 200 may then continue with transferring one or more items to a subsequent conveyor based on the determined column, as at 212. For example, based on the determined column of items that comprises a single file or line of items, the column of items may be transferred from the input conveyor to a subsequent conveyor, e.g., a separation conveyor, by causing movement of the column of items until the first trailing edge of any item or a smallest or shortest item is transferred to the subsequent conveyor. In this manner, the column of items may be transferred to subsequent processes such that no two items within the column of items are positioned adjacent each other along a direction of movement of the input conveyor, such that all items of the column of items may be singulated from each other upon transfer to the output conveyor. In addition, a controller may cause transfer of the one or more items based on the column of items that is determined from the first leading edge of the first item to the first trailing edge of any item based at least in part on the processing of the imaging data.

Figure 3:
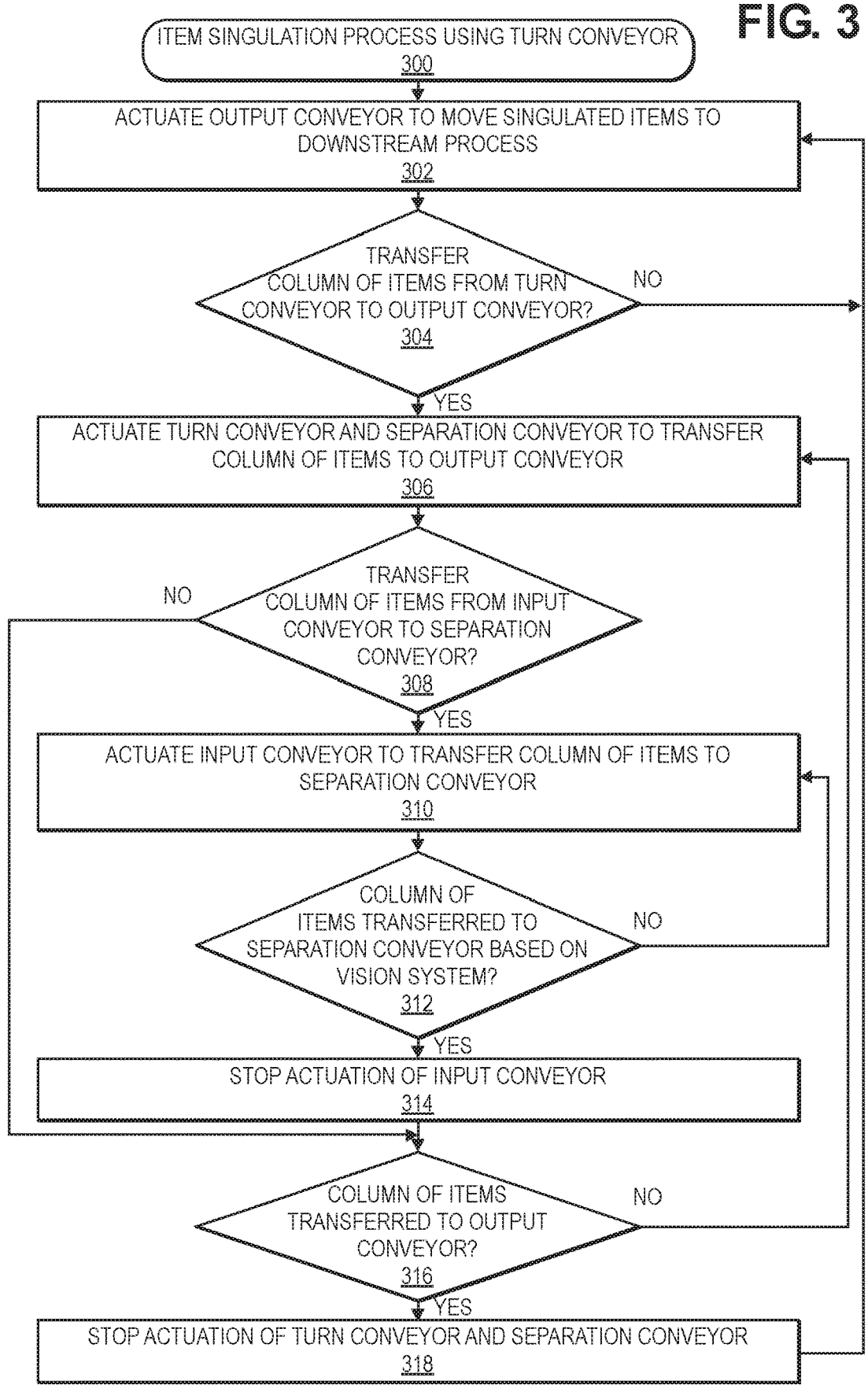
FIG. 3 is a flow diagram illustrating an example item singulation process using a turn conveyor, in accordance with implementations of the present disclosure.

FIG. 3 is a flow diagram illustrating an example item singulation process using a turn conveyor 300, in accordance with implementations of the present disclosure.

The process 300 may begin by actuating an output conveyor to move singulated items to a downstream process, as at 302. For example, one or more actuators of the output conveyor may cause rotation or movement of rollers, belts, or other conveyance mechanisms of the output conveyor to move or transfer singulated items on the output conveyor to one or more downstream processes. In addition, a controller may instruct actuation of the output conveyor to transfer singulated items to downstream processes.

The process 300 may continue by determining whether to transfer a column of items from a turn conveyor to the output conveyor, as at 304. For example, if a transfer zone of the output conveyor at which the output conveyor may receive individual columns of items is empty, it may be determined that a column of items is to be transferred from the turn conveyor to the output conveyor. As described herein, one or more sensors, such as cameras, imaging sensors, imaging devices, depth sensors, infrared sensors, photoeyes, light curtains, proximity sensors, or other types of sensors, associated with the output conveyor may detect the presence or absence of one or more items within the transfer zone of the output conveyor, and/or feedback or data associated with actuators or other portions of the output conveyor, e.g., using data from motor or actuator encoders, data associated with times or durations of operation, and/or other data or measurements related to operational times or traveled distances of one or more objects on the output conveyor, may be processed to determine the presence or absence of one or more items within the transfer zone of the output conveyor. In addition, a controller may receive data from one or more sensors or data or feedback from actuators or other portions of the output conveyor and determine whether to transfer a column of items from the turn conveyor to the output conveyor.

If it is determined that a column of items is not to be transferred to the output conveyor, e.g., because one or more items is present within the transfer zone of the output conveyor, and/or to alter or adjust a spacing of individual columns of items, then the process 300 may return to step 302 to continue to actuate the output conveyor to move singulated items to downstream processes.

If, however, it is determined that a column of items is to be transferred to the output conveyor, e.g., because no items are present within the transfer zone of the output conveyor, and/or following alteration or adjustment of spacing of individual columns of items, then the process 300 may proceed by actuating the turn conveyor and a separation conveyor to transfer a column of items to the output conveyor, as at 306. For example, the turn conveyor may be actuated to move or transfer a column of items from the turn conveyor to the output conveyor, and/or the separation conveyor may also be actuated together with the turn conveyor, e.g., at a same speed at least during transfer therebetween, to move or transfer a column of items from the separation conveyor to the turn conveyor and then to the output conveyor. In addition, a controller may instruct actuation of the turn conveyor and/or the separation conveyor to transfer a column of items to the output conveyor.

The process 300 may then continue to determine whether to transfer a column of items from an input conveyor to the separation conveyor, as at 308. For example, if the separation conveyor, or both the separation conveyor and the turn conveyor, is empty, it may be determined that a column of items is to be transferred from the input conveyor to the separation conveyor. As described herein, one or more sensors, such as cameras, imaging sensors, imaging devices, depth sensors, infrared sensors, photoeyes, light curtains, proximity sensors, or other types of sensors, associated with the separation conveyor and/or the turn conveyor may detect the presence or absence of one or more items on the separation conveyor and/or the turn conveyor, and/or feedback or data associated with actuators or other portions of the separation conveyor and/or the turn conveyor, e.g., using data from motor or actuator encoders, data associated with times or durations of operation, and/or other data or measurements related to operational times or traveled distances of one or more objects on the separation conveyor and/or the turn conveyor, may be processed to determine the presence or absence of one or more items on the separation conveyor and/or the turn conveyor. In addition, a controller may receive data from one or more sensors or data or feedback from actuators or other portions of the separation conveyor and/or the turn conveyor and determine whether to transfer a column of items from the input conveyor to the separation conveyor.

If it is determined that a column of items is not to be transferred to the separation conveyor, e.g., because one or more items is present on the separation conveyor and/or the turn conveyor, and/or to alter or adjust a spacing of individual columns of items, then the process 300 may proceed to step 316 as further described herein.

If, however, it is determined that a column of items is to be transferred to the separation conveyor, e.g., because no items are present on the separation conveyor and/or the turn conveyor, and/or following alteration or adjustment of spacing of individual columns of items, then the process 300 may proceed to actuate the input conveyor to transfer a column of items to the separation conveyor, as at 310. For example, the input conveyor may be actuated to move or transfer a column of items from the input conveyor to the separation conveyor, and/or the separation conveyor may also be actuated together with the input conveyor, e.g., at a same speed at least during transfer therebetween, to move or transfer a column of items from the input conveyor to the separation conveyor. In addition, a controller may instruct actuation of the input conveyor and/or the separation conveyor to transfer a column of items to the separation conveyor.

The process 300 may then continue with determining whether the column of items is transferred to the separation conveyor based on the vision system, as at 312. For example, the column of items may be determined between a first leading edge of a first item and a first trailing edge of any item or a smallest or shortest item in the column of items, and the input conveyor may be actuated to move or transfer the column of items until the first trailing edge of the column of items is transferred to the separation conveyor, based at least in part on processing of imaging data from the vision system. In addition, a controller may receive and process imaging data from the vision system to determine the column of items and to control actuation of the input conveyor based on the determined column of items.

If it is determined that the column of items is not yet transferred to the separation conveyor, then the process 300 may return to step 310 to continue to actuate the input conveyor to transfer the column of items to the separation conveyor.

If, however, it is determined that the column of items is transferred to the separation conveyor, then the process 300 may proceed with stopping actuation of the input conveyor, as at 314. For example, the input conveyor may be stopped responsive to transferring the column of items to the separation conveyor, in order to alter or adjust a spacing between individual columns of items as the columns are transferred to the output conveyor, e.g., via the separation conveyor and turn conveyor. In addition, a controller may instruct stopping of actuation of the input conveyor responsive to transferring a column of items to the separation conveyor.

The process 300 may then continue by determining whether a column of items has been transferred to the output conveyor, as at 316. For example, if a transfer zone of the output conveyor at which the output conveyor may receive individual columns of items has received one or more items, it may be determined that a column of items has been transferred from the turn conveyor to the output conveyor. As described herein, one or more sensors, such as cameras, imaging sensors, imaging devices, depth sensors, infrared sensors, photoeyes, light curtains, proximity sensors, or other types of sensors, associated with the output conveyor may detect the presence or absence of one or more items within the transfer zone of the output conveyor, and/or feedback or data associated with actuators or other portions of the output conveyor, e.g., using data from motor or actuator encoders, data associated with times or durations of operation, and/or other data or measurements related to operational times or traveled distances of one or more objects on the output conveyor, may be processed to determine the presence or absence of one or more items within the transfer zone of the output conveyor. In addition, a controller may receive data from one or more sensors or data or feedback from actuators or other portions of the output conveyor and determine whether a column of items has been transferred from the turn conveyor to the output conveyor.

If it is determined that the column of items has not yet been transferred to the output conveyor, then the process 300 may return to step 306 to continue to actuate the turn conveyor and/or the separation conveyor to transfer a column of items to the output conveyor.

If, however, it is determined that the column of items has been transferred to the output conveyor, then the process 300 may proceed with stopping actuation of the turn conveyor and/or the separation conveyor, as at 318. For example, the turn conveyor and/or the separation conveyor may be stopped responsive to transferring the column of items to the output conveyor, in order to alter or adjust a spacing between individual columns of items as the columns are transferred to the output conveyor, e.g., via the separation conveyor and turn conveyor. In addition, a controller may instruct stopping of actuation of the turn conveyor and/or the separation conveyor responsive to transferring a column of items to the output conveyor.

Then, the process 300 may return to step 302 to continue to actuate the output conveyor to move singulated items to downstream processes, and the process 300 may substantially repeat to continue to identify, separate, and singulate items using the example item singulation systems described herein.

Figure 4A:
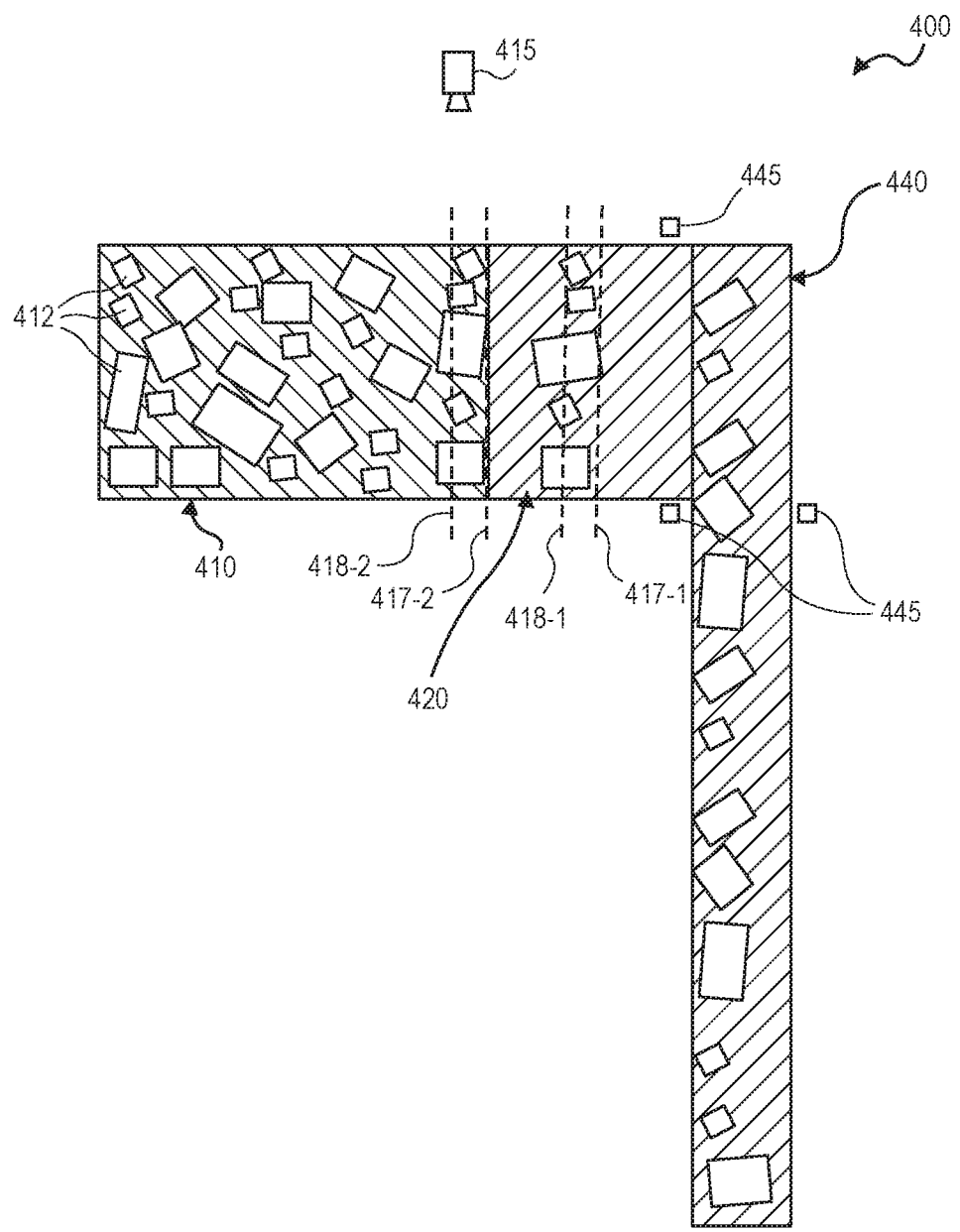
FIG. 4A is a schematic, overhead view diagram of an example item singulation system using an orthogonal conveyor, in accordance with implementations of the present disclosure.
Figure 4B:
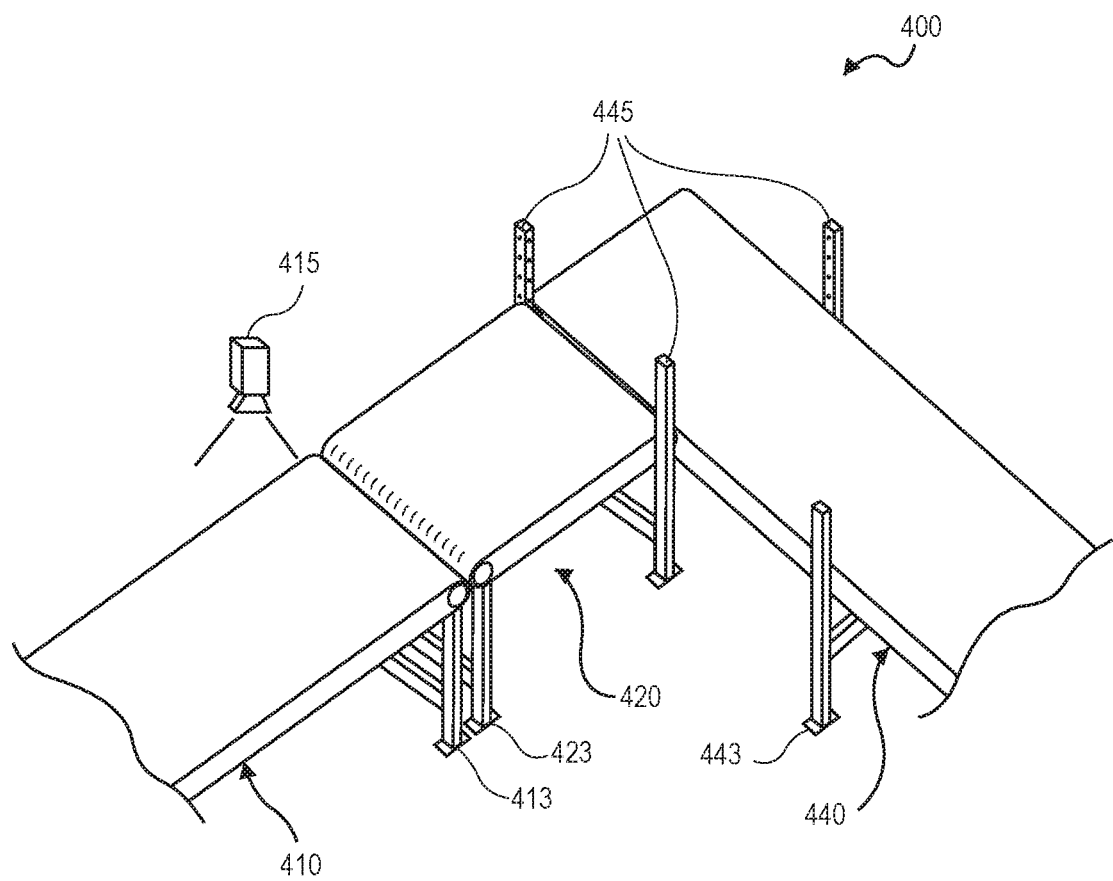
FIG. 4B is a schematic, perspective view diagram of an example item singulation system using an orthogonal conveyor, in accordance with implementations of the present disclosure.

FIG. 4A is a schematic, overhead view diagram of an example item singulation system 400 using an orthogonal conveyor, in accordance with implementations of the present disclosure, and FIG. 4B is a schematic, perspective view diagram of an example item singulation system 400 using an orthogonal conveyor, in accordance with implementations of the present disclosure.

The example item singulation system 400 may include an input conveyor 410, a vision system 415, a separation conveyor 420, and an output conveyor 440. Various downstream processes may receive singulated items from the output conveyor 440, the output conveyor 440 may receive individual columns of items from the separation conveyor 420, the separation conveyor 420 may receive individual columns of items from the input conveyor 410, the input conveyor 410 may receive a plurality of items from various upstream processes, and the various upstream processes may destack and/or deshingle the plurality of items such that a single or flat layer of items is transferred to the input conveyor 410, as described for example in U.S. application Ser. Nos. 16/369,431 and 16/369,493, the contents of which are herein incorporated by reference in their entirety. As described herein, a column of items may comprise a single file or line of items that extends substantially transverse to a direction of movement of the input conveyor 410, and that extends substantially parallel to a direction of movement of the output conveyor 440 upon transfer to the output conveyor 440.

The input conveyor 410 may comprise a frame 413 and one or more rollers, belts, or other conveyance mechanisms, the separation conveyor 420 may comprise a frame 423 and one or more rollers, belts, or other conveyance mechanisms, and the output conveyor 440 may comprise a frame 443 and one or more rollers, belts, or other conveyance mechanisms. The frames 413, 423, 443 may be formed of various materials such as metals, composites, plastics, other materials, or combinations thereof. In addition, one or more of the input conveyor 410, the separation conveyor 420, and/or the output conveyor 440 may include various guards, rails, plates, or other structural elements to prevent items from falling off the sides or edges of the conveyors.

Each of the input conveyor 410, separation conveyor 420, and output conveyor 440 may be configured to stop, start, and rotate or actuate at various speeds to receive and transfer items. In addition, during transfer of items from the input conveyor 410 to the separation conveyor 420, the input conveyor 410 and separation conveyor 420 may rotate at substantially the same speed. Further, during transfer of items from the separation conveyor 420 to the output conveyor 440, the separation conveyor 420 may rotate at a first speed, and the output conveyor 440 may rotate at a second speed, e.g., may be stopped or not rotate, or may rotate at a second speed that is the same as, faster than, or slower than the first speed.

In addition, the output conveyor 440 may be oriented in a position that is rotated approximately 90 degrees relative the input conveyor 410, such that a direction of movement of the output conveyor 440 is approximately orthogonal to a direction of movement of the input conveyor 410. In other example embodiments, the output conveyor 440 may be oriented in a position that is rotated by different amounts or angles relative to the input conveyor 410, e.g., approximately 45 degrees, approximately 60 degrees, approximately 75 degrees, or other angles or amounts.

In example embodiments, the vision system 415 may comprise one or more cameras, imaging sensors, depth sensors, infrared sensors, or other imaging devices that are positioned overhead, to the side, or at other positions relative to the input conveyor 410, and the vision system 415 may be configured to capture imaging data of a plurality of items 412 received by the input conveyor 410. The imaging data captured by the vision system 415 may be processed to determine one or more lines, edges, corners, surfaces, or other features of the plurality of items 412 on the input conveyor 410, e.g., using various image recognition or image processing techniques or algorithms.

Further, the imaging data captured by the vision system 415 may be processed to determine individual columns of items based at least in part on the determined lines, edges, corners, surfaces, or other features of the plurality of items 412. For example, a first leading edge 417 of a column of items may be determined based at least in part on determined features of the plurality of items 412. As shown in FIG. 4A, the first leading edge may comprise a first leading edge 417-1 of a first item of an individual column of items that has previously been transferred from the input conveyor 410 to the separation conveyor 420. Likewise, the first leading edge may comprise a first leading edge 417-2 of another first item of an individual column of items that is to be transferred from the input conveyor 410 to the separation conveyor 420.

In addition, responsive to determining a first leading edge 417 of a column of items, a first trailing edge 418 of the column of items may be determined based at least in part on determined features of the plurality of items 412. In example embodiments, the first trailing edge 418 may comprise a first trailing edge of any item that is identified after identifying a first leading edge of a first item in an individual column of items. In other example embodiments, the first trailing edge 418 may comprise a first trailing edge of a smallest or shortest item that is identified after identifying a first leading edge of a first item in an individual column of items. As shown in FIG. 4A, the first trailing edge may comprise a first trailing edge 418-1 of any item or a smallest or shortest item of an individual column of items that has previously been transferred from the input conveyor 410 to the separation conveyor 420. Likewise, the first trailing edge may comprise a first trailing edge 418-2 of any item or a smallest or shortest item of an individual column of items that is to be transferred from the input conveyor 410 to the separation conveyor 420.

In this manner, imaging data from the vision system 415 may be processed to determine individual columns of items that each comprises a single file or line of items that extends substantially transverse to a direction of movement of the input conveyor 410 and that may be transferred from the input conveyor 410 to the separation conveyor 420. As a result, the individual columns of items may be transferred to the output conveyor 440, e.g., via the separation conveyor 420, such that a single file or line of items extends substantially parallel to a direction of movement of the output conveyor 440.

As described herein, adjacent conveyors may be rotated at substantially a same speed during transfer of a column of items between adjacent conveyors, in order to maintain the column of items as a single file or line of items. When a column of items is moved by a conveyor but is not transferred between adjacent conveyors, each of the conveyors may rotate at various speeds and/or may start and stop rotation, e.g., to alter or adjust spacing between individual columns of items.

Further, the operations of the example item singulation system may be controlled substantially as a pull system, e.g., by a controller or control system as further described herein. For example, the output conveyor 440 may be actuated to transfer singulated items to various downstream processes. In addition, the output conveyor 440 may be selectively actuated to alter or adjust spacing between individual columns of items received from the separation conveyor 420. Upon determining that a column of items is to be transferred from the separation conveyor 420 to the output conveyor 440, e.g., to a transfer zone of the output conveyor 440 that is adjacent the separation conveyor 420, the separation conveyor 420 may be actuated to transfer a column of items to the transfer zone of the output conveyor 440.

In some example embodiments, one or more sensors 445 may be associated with the output conveyor 440, e.g., one or more boundaries, edges, or portions of a transfer zone of the output conveyor 440. The one or more sensors 445 may comprise cameras, imaging sensors, imaging devices, depth sensors, infrared sensors, photoeyes, light curtains, proximity sensors, or other types of sensors. For example, the one or more sensors 445 may detect that no objects are present in the transfer zone of the output conveyor 440, and/or that all objects have moved downstream and out of the transfer zone of the output conveyor 440, in order to determine that a column of items is to be transferred from the separation conveyor 420 to the output conveyor 440. In addition, the one or more sensors 445 may detect that one or more objects are present in the transfer zone of the output conveyor 440, and/or that one or more objects have moved downstream and into the transfer zone of the output conveyor 440, in order to determine that a column of items has been transferred from the separation conveyor 420 to the output conveyor 440. Other conveyors or portions thereof of the example item singulation system, e.g., the separation conveyor 420, and/or the input conveyor 410, may also include one or more sensors, similar to the one or more sensors 445 described with reference to the output conveyor 440, to control actuations of the other conveyors and corresponding transfers of items between conveyors.

Continuing with the operations of the example item singulation system that may be controlled substantially as a pull system, upon determining that a column of items is to be transferred from the separation conveyor 420 to the output conveyor 440, e.g., to a transfer zone of the output conveyor 440 that is adjacent the separation conveyor 420, the separation conveyor 420 may be actuated to transfer a column of items to the transfer zone of the output conveyor 440. Further, if it is determined that no objects are present on the separation conveyor 420, the input conveyor 410 may be actuated to transfer a column of items from the input conveyor 410 to the separation conveyor 420 based at least in part on the data from the vision system 415, which column of items will subsequently be transferred to the transfer zone of the output conveyor 440. After transferring the column of items from the input conveyor 410 to the separation conveyor 420 based at least in part on the data from the vision system 415, the input conveyor 410 may be stopped until it is subsequently determined that a next column of items is to be transferred from the input conveyor 410 to the separation conveyor 420.

By operating the example item singulation system substantially as a pull system, a substantially continuous, single file or line of items may be transferred to the output conveyor 440, by selective actuations of the output conveyor 440, separation conveyor 420, and/or input conveyor 410 such that individual columns of items are identified, separated, and singulated for various downstream processes.

Although example embodiments described herein refer to one or more sensors 445 that may be used to control operations of the example item singulation system substantially as a pull system, in other example embodiments, actuations of one or more conveyors may be controlled on the basis of an amount, degree, or distance of movement of the one or more conveyors that may be determined based on feedback or data associated with actuators or other portions of the one or more conveyors, e.g., using data from motor or actuator encoders, data associated with times or durations of operation, and/or other data or measurements related to operational times or traveled distances of one or more objects on the one or more conveyors.

Figure 5:
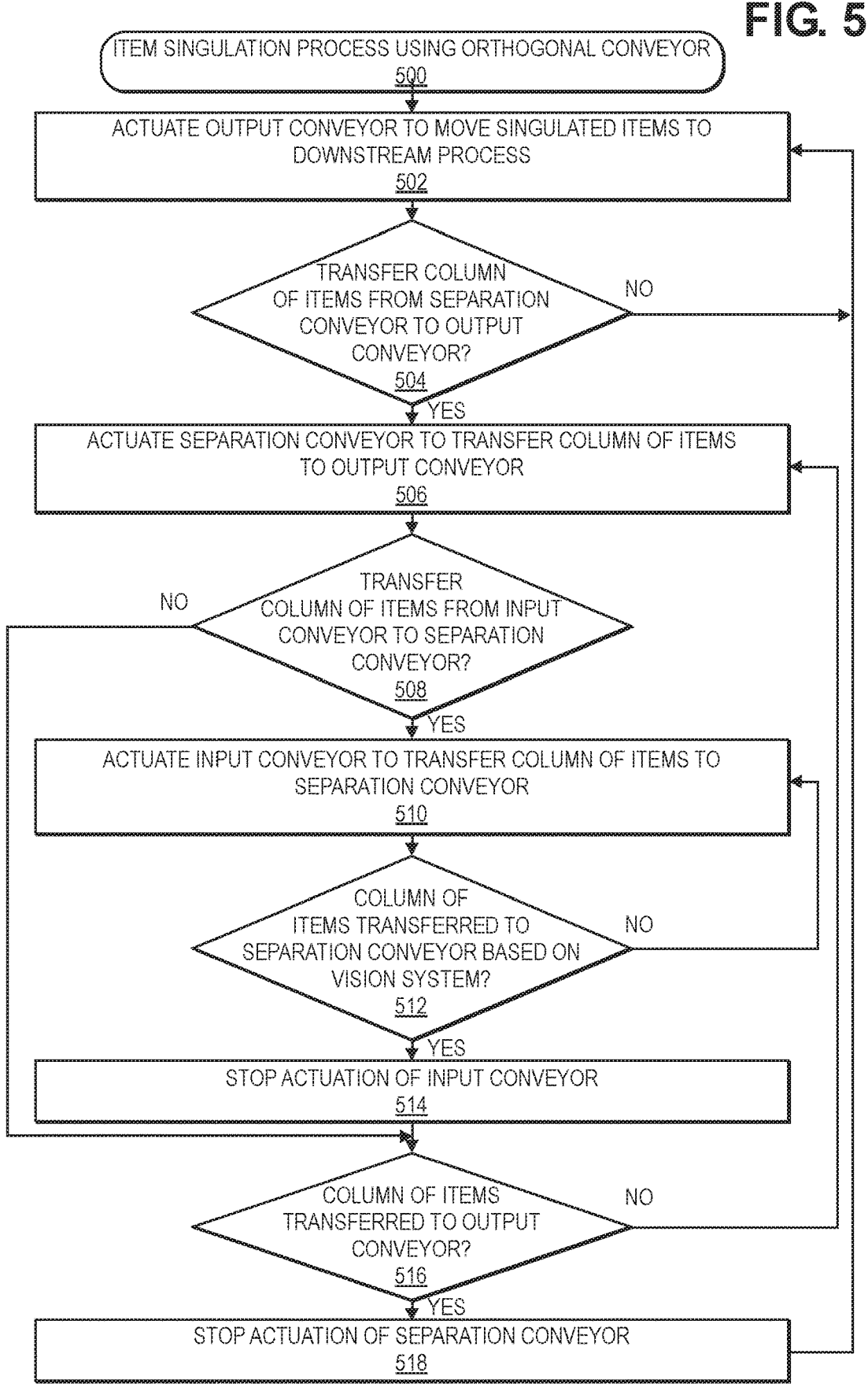
FIG. 5 is a flow diagram illustrating an example item singulation process using an orthogonal conveyor, in accordance with implementations of the present disclosure.

FIG. 5 is a flow diagram illustrating an example item singulation process using an orthogonal conveyor 500, in accordance with implementations of the present disclosure.

The process 500 may begin by actuating an output conveyor to move singulated items to a downstream process, as at 502. For example, one or more actuators of the output conveyor may cause rotation or movement of rollers, belts, or other conveyance mechanisms of the output conveyor to move or transfer singulated items on the output conveyor to one or more downstream processes. In addition, a controller may instruct actuation of the output conveyor to transfer singulated items to downstream processes.

The process 500 may continue by determining whether to transfer a column of items from a separation conveyor to the output conveyor, as at 504. For example, if a transfer zone of the output conveyor at which the output conveyor may receive individual columns of items is empty, it may be determined that a column of items is to be transferred from the separation conveyor to the output conveyor. As described herein, one or more sensors, such as cameras, imaging sensors, imaging devices, depth sensors, infrared sensors, photoeyes, light curtains, proximity sensors, or other types of sensors, associated with the output conveyor may detect the presence or absence of one or more items within the transfer zone of the output conveyor, and/or feedback or data associated with actuators or other portions of the output conveyor, e.g., using data from motor or actuator encoders, data associated with times or durations of operation, and/or other data or measurements related to operational times or traveled distances of one or more objects on the output conveyor, may be processed to determine the presence or absence of one or more items within the transfer zone of the output conveyor. In addition, a controller may receive data from one or more sensors or data or feedback from actuators or other portions of the output conveyor and determine whether to transfer a column of items from the separation conveyor to the output conveyor.

If it is determined that a column of items is not to be transferred to the output conveyor, e.g., because one or more items is present within the transfer zone of the output conveyor, and/or to alter or adjust a spacing of individual columns of items, then the process 500 may return to step 502 to continue to actuate the output conveyor to move singulated items to downstream processes.

If, however, it is determined that a column of items is to be transferred to the output conveyor, e.g., because no items are present within the transfer zone of the output conveyor, and/or following alteration or adjustment of spacing of individual columns of items, then the process 500 may proceed by actuating the separation conveyor to transfer a column of items to the output conveyor, as at 506. For example, the separation conveyor may be actuated to move or transfer a column of items from the separation conveyor to the output conveyor. In addition, a controller may instruct actuation of the separation conveyor to transfer a column of items to the output conveyor.

The process 500 may then continue to determine whether to transfer a column of items from an input conveyor to the separation conveyor, as at 508. For example, if the separation conveyor is empty, it may be determined that a column of items is to be transferred from the input conveyor to the separation conveyor. As described herein, one or more sensors, such as cameras, imaging sensors, imaging devices, depth sensors, infrared sensors, photoeyes, light curtains, proximity sensors, or other types of sensors, associated with the separation conveyor may detect the presence or absence of one or more items on the separation conveyor, and/or feedback or data associated with actuators or other portions of the separation conveyor, e.g., using data from motor or actuator encoders, data associated with times or durations of operation, and/or other data or measurements related to operational times or traveled distances of one or more objects on the separation conveyor, may be processed to determine the presence or absence of one or more items on the separation conveyor. In addition, a controller may receive data from one or more sensors or data or feedback from actuators or other portions of the separation conveyor and determine whether to transfer a column of items from the input conveyor to the separation conveyor.

If it is determined that a column of items is not to be transferred to the separation conveyor, e.g., because one or more items is present on the separation conveyor, and/or to alter or adjust a spacing of individual columns of items, then the process 500 may proceed to step 516 as further described herein.

If, however, it is determined that a column of items is to be transferred to the separation conveyor, e.g., because no items are present on the separation conveyor, and/or following alteration or adjustment of spacing of individual columns of items, then the process 500 may proceed to actuate the input conveyor to transfer a column of items to the separation conveyor, as at 510. For example, the input conveyor may be actuated to move or transfer a column of items from the input conveyor to the separation conveyor, and/or the separation conveyor may also be actuated together with the input conveyor, e.g., at a same speed at least during transfer therebetween, to move or transfer a column of items from the input conveyor to the separation conveyor. In addition, a controller may instruct actuation of the input conveyor and/or the separation conveyor to transfer a column of items to the separation conveyor.

The process 500 may then continue with determining whether the column of items is transferred to the separation conveyor based on the vision system, as at 512. For example, the column of items may be determined between a first leading edge of a first item and a first trailing edge of any item or a smallest or shortest item in the column of items, and the input conveyor may be actuated to move or transfer the column of items until the first trailing edge of the column of items is transferred to the separation conveyor, based at least in part on processing of imaging data from the vision system. In addition, a controller may receive and process imaging data from the vision system to determine the column of items and to control actuation of the input conveyor based on the determined column of items.

If it is determined that the column of items is not yet transferred to the separation conveyor, then the process 500 may return to step 510 to continue to actuate the input conveyor to transfer the column of items to the separation conveyor.

If, however, it is determined that the column of items is transferred to the separation conveyor, then the process 500 may proceed with stopping actuation of the input conveyor, as at 514. For example, the input conveyor may be stopped responsive to transferring the column of items to the separation conveyor, in order to alter or adjust a spacing between individual columns of items as the columns are transferred to the output conveyor, e.g., via the separation conveyor. In addition, a controller may instruct stopping of actuation of the input conveyor responsive to transferring a column of items to the separation conveyor.

The process 500 may then continue by determining whether a column of items has been transferred to the output conveyor, as at 516. For example, if a transfer zone of the output conveyor at which the output conveyor may receive individual columns of items has received one or more items, it may be determined that a column of items has been transferred from the separation conveyor to the output conveyor. As described herein, one or more sensors, such as cameras, imaging sensors, imaging devices, depth sensors, infrared sensors, photoeyes, light curtains, proximity sensors, or other types of sensors, associated with the output conveyor may detect the presence or absence of one or more items within the transfer zone of the output conveyor, and/or feedback or data associated with actuators or other portions of the output conveyor, e.g., using data from motor or actuator encoders, data associated with times or durations of operation, and/or other data or measurements related to operational times or traveled distances of one or more objects on the output conveyor, may be processed to determine the presence or absence of one or more items within the transfer zone of the output conveyor. In addition, a controller may receive data from one or more sensors or data or feedback from actuators or other portions of the output conveyor and determine whether a column of items has been transferred from the separation conveyor to the output conveyor.

If it is determined that the column of items has not yet been transferred to the output conveyor, then the process 500 may return to step 506 to continue to actuate the separation conveyor to transfer a column of items to the output conveyor.

If, however, it is determined that the column of items has been transferred to the output conveyor, then the process 500 may proceed with stopping actuation of the separation conveyor, as at 518. For example, the separation conveyor may be stopped responsive to transferring the column of items to the output conveyor, in order to alter or adjust a spacing between individual columns of items as the columns are transferred to the output conveyor, e.g., via the separation conveyor. In addition, a controller may instruct stopping of actuation of the separation conveyor responsive to transferring a column of items to the output conveyor.

Then, the process 500 may return to step 502 to continue to actuate the output conveyor to move singulated items to downstream processes, and the process 500 may substantially repeat to continue to identify, separate, and singulate items using the example item singulation systems described herein.

Figure 6A:
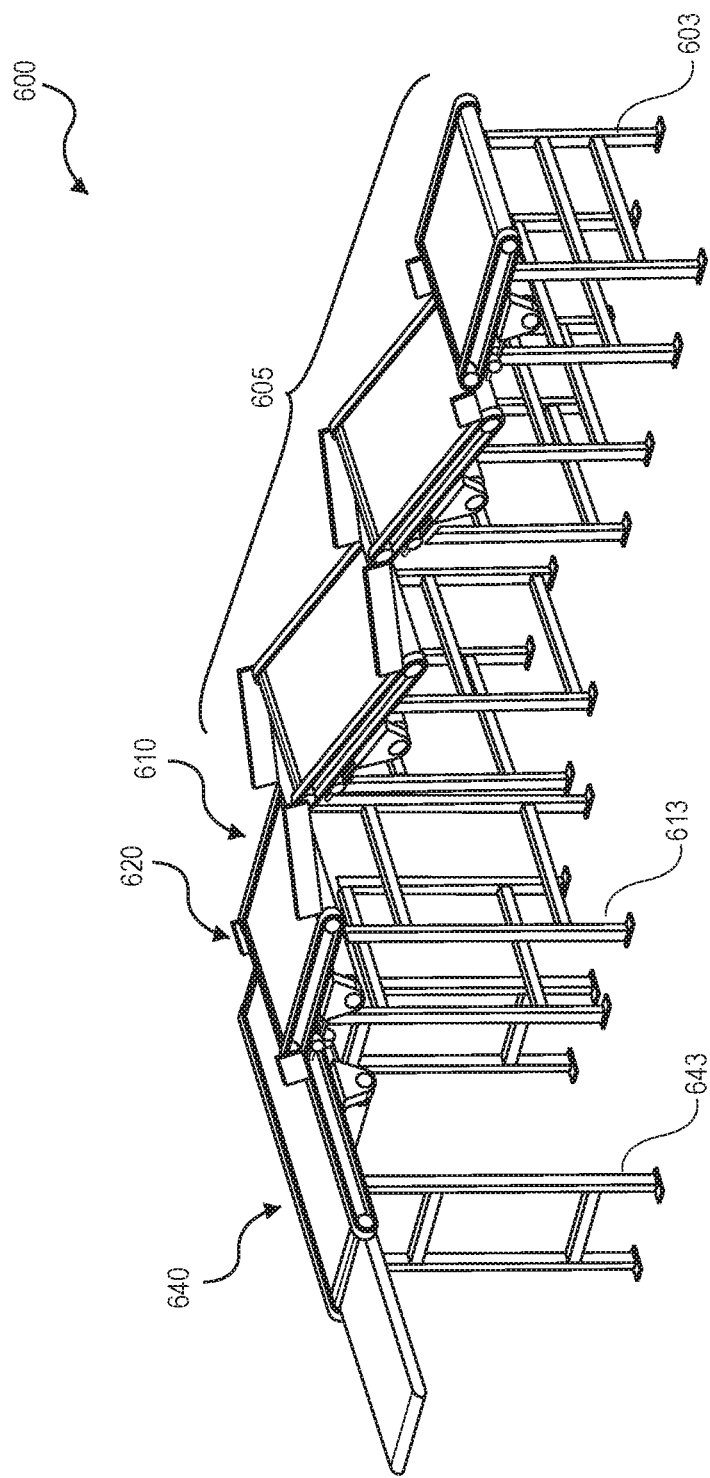
FIG. 6A is a schematic, perspective view diagram of an example item singulation system using a separation slide and an orthogonal conveyor, in accordance with implementations of the present disclosure.
Figure 6B:
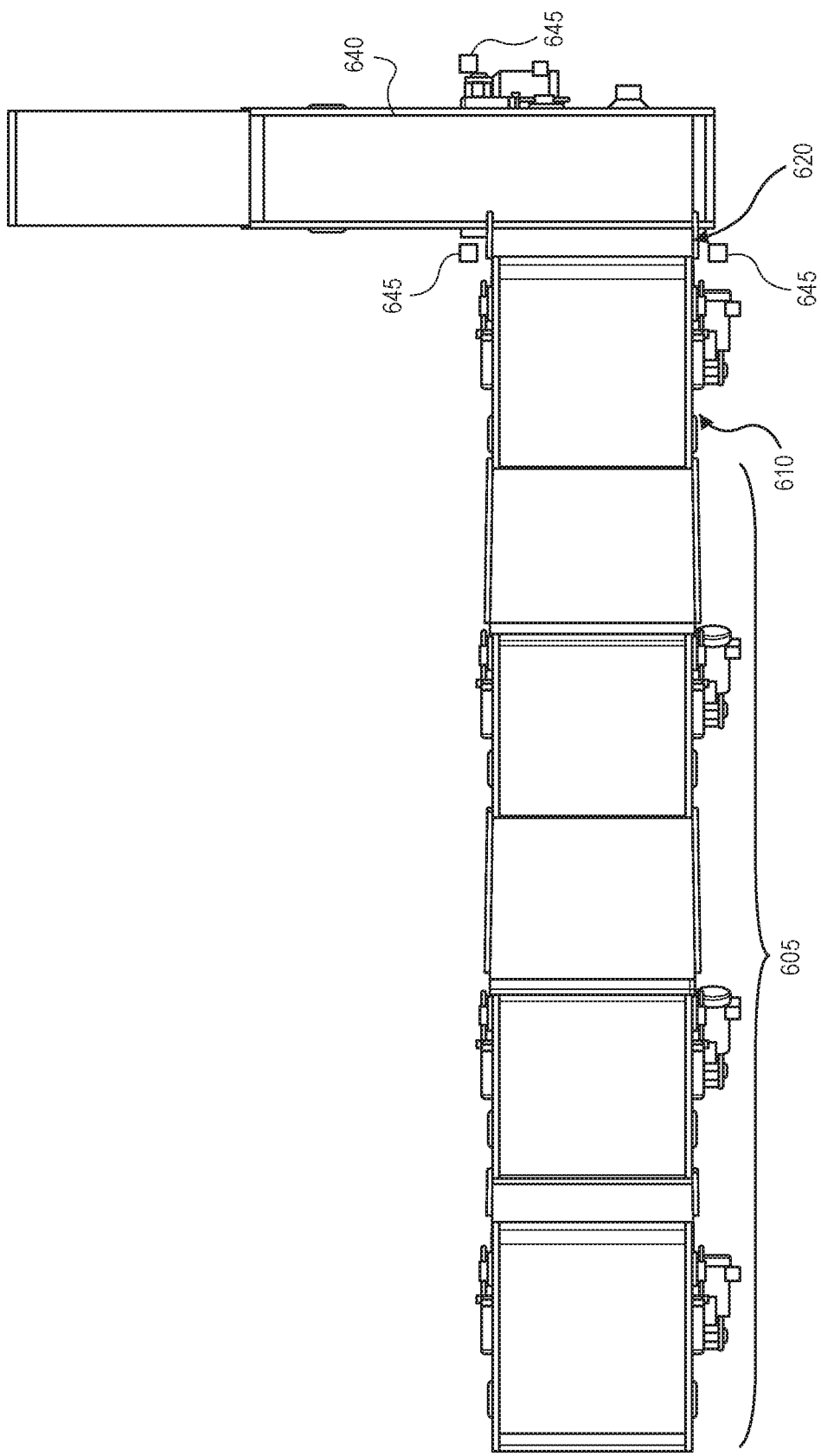
FIG. 6B is a schematic, overhead view diagram of an example item singulation system using a separation slide and an orthogonal conveyor, in accordance with implementations of the present disclosure.

FIG. 6A is a schematic, perspective view diagram of an example item singulation system 600 using a separation slide and an orthogonal conveyor, in accordance with implementations of the present disclosure, and FIG. 6B is a schematic, overhead view diagram of an example item singulation system 600 using a separation slide and an orthogonal conveyor, in accordance with implementations of the present disclosure.

The example item singulation system 600 may include an input conveyor 610, a separation slide 620, and an output conveyor 640. Various downstream processes may receive singulated items from the output conveyor 640, the output conveyor 640 may receive individual columns of items from the separation slide 620, the separation slide 620 may receive individual columns of items from the input conveyor 610, the input conveyor 610 may receive a plurality of items from various upstream processes 605, and the various upstream processes 605 may destack and/or deshingle the plurality of items such that a single or flat layer of items is transferred to the input conveyor 610, as described for example in U.S. application Ser. Nos. 16/369,431 and 16/369,493, the contents of which are herein incorporated by reference in their entirety. As described herein, a column of items may comprise a single file or line of items that extends substantially transverse to a direction of movement of the input conveyor 610, and that extends substantially parallel to a direction of movement of the output conveyor 640 upon transfer to the output conveyor 640.

The input conveyor 610 may comprise a frame 613 and one or more rollers, belts, or other conveyance mechanisms, the separation slide 620 may comprise a frame and one or more plates, surfaces, guides, or other sliding elements, and the output conveyor 640 may comprise a frame 643 and one or more rollers, belts, or other conveyance mechanisms. The frames 613, 643 may be formed of various materials such as metals, composites, plastics, other materials, or combinations thereof. In addition, one or more of the input conveyor 610, the separation slide 620, and/or the output conveyor 640 may include various guards, rails, plates, or other structural elements to prevent items from falling off the sides or edges of the conveyors.

Each of the input conveyor 610 and output conveyor 640 may be configured to stop, start, and rotate or actuate at various speeds to receive and transfer items. In addition, the separation slide 620 may be configured to transfer items between the input conveyor 610 and the output conveyor 640 using weight of the items or the force of gravity to cause movement or sliding of the items along the separation slide 620.

In addition, the output conveyor 640 may be oriented in a position that is rotated approximately 90 degrees relative the input conveyor 610, such that a direction of movement of the output conveyor 640 is approximately orthogonal to a direction of movement of the input conveyor 610. In other example embodiments, the output conveyor 640 may be oriented in a position that is rotated by different amounts or angles relative to the input conveyor 610, e.g., approximately 45 degrees, approximately 60 degrees, approximately 75 degrees, or other angles or amounts.

The various upstream processes 605 may cause destacking and/or deshingling of items received by the upstream processes 605, such that a single or flat layer of items is transferred to the input conveyor 610. In addition, the various upstream processes 605 may cause separation or isolation of individual columns of items from each other, such that an individual column of items that comprises a single file or line of items that extends substantially transverse to a direction of movement of the input conveyor 610 is transferred to the input conveyor 610. Thereafter, an individual column of items may be transferred to the separation slide 620 and then transferred on to the output conveyor 640, such that a single file or line of items extends substantially parallel to a direction of movement of the output conveyor 640.

As described herein, adjacent conveyors may be rotated at substantially a same speed during transfer of a column of items between adjacent conveyors, in order to maintain the column of items as a single file or line of items. When a column of items is moved by a conveyor but is not transferred between adjacent conveyors, each of the conveyors may rotate at various speeds and/or may start and stop rotation, e.g., to alter or adjust spacing between individual columns of items.

Further, the operations of the example item singulation system may be controlled substantially as a pull system, e.g., by a controller or control system as further described herein. For example, the output conveyor 640 may be actuated to transfer singulated items to various downstream processes. In addition, the output conveyor 640 may be selectively actuated to alter or adjust spacing between individual columns of items received from the separation slide 620. Upon determining that a column of items is to be transferred from the separation slide 620 to the output conveyor 640, e.g., to a transfer zone of the output conveyor 640 that is adjacent the separation slide 620, the input conveyor 610 may be actuated to transfer a column of items to the separation slide 620 and then to the transfer zone of the output conveyor 640.

In some example embodiments, one or more sensors 645 may be associated with the output conveyor 640, e.g., one or more boundaries, edges, or portions of a transfer zone of the output conveyor 640. The one or more sensors 645 may comprise cameras, imaging sensors, imaging devices, depth sensors, infrared sensors, photoeyes, light curtains, proximity sensors, or other types of sensors. For example, the one or more sensors 645 may detect that no objects are present in the transfer zone of the output conveyor 640, and/or that all objects have moved downstream and out of the transfer zone of the output conveyor 640, in order to determine that a column of items is to be transferred from the separation slide 620 to the output conveyor 640. In addition, the one or more sensors 645 may detect that one or more objects are present in the transfer zone of the output conveyor 640, and/or that one or more objects have moved downstream and into the transfer zone of the output conveyor 640, in order to determine that a column of items has been transferred from the separation slide 620 to the output conveyor 640.

Other conveyors or portions thereof of the example item singulation system, e.g., the separation slide 620, and/or the input conveyor 610, may also include one or more sensors, similar to the one or more sensors 645 described with reference to the output conveyor 640, to control actuations of the other conveyors and corresponding transfers of items between conveyors.

Continuing with the operations of the example item singulation system that may be controlled substantially as a pull system, upon determining that a column of items is to be transferred to the separation slide 620 and then to the output conveyor 640, e.g., to a transfer zone of the output conveyor 640 that is adjacent the separation slide 620, the input conveyor 610 may be actuated to transfer a column of items to the separation slide 620 and then to the transfer zone of the output conveyor 640. Further, if it is determined that no objects are present on the separation slide 620, the input conveyor 610 may be actuated to transfer a column of items from the input conveyor 610 to the separation slide 620, which column of items will subsequently be transferred to the transfer zone of the output conveyor 640. After transferring the column of items from the input conveyor 610 to the separation slide 620, the input conveyor 610 may be stopped until it is subsequently determined that a next column of items is to be transferred from the input conveyor 610 to the separation slide 620.

By operating the example item singulation system substantially as a pull system, a substantially continuous, single file or line of items may be transferred to the output conveyor 640, by selective actuations of the output conveyor 640 and/or input conveyor 610 such that individual columns of items are identified, separated, and singulated for various downstream processes.

Although example embodiments described herein refer to one or more sensors 645 that may be used to control operations of the example item singulation system substantially as a pull system, in other example embodiments, actuations of one or more conveyors may be controlled on the basis of an amount, degree, or distance of movement of the one or more conveyors that may be determined based on feedback or data associated with actuators or other portions of the one or more conveyors, e.g., using data from motor or actuator encoders, data associated with times or durations of operation, and/or other data or measurements related to operational times or traveled distances of one or more objects on the one or more conveyors.

Figure 7:
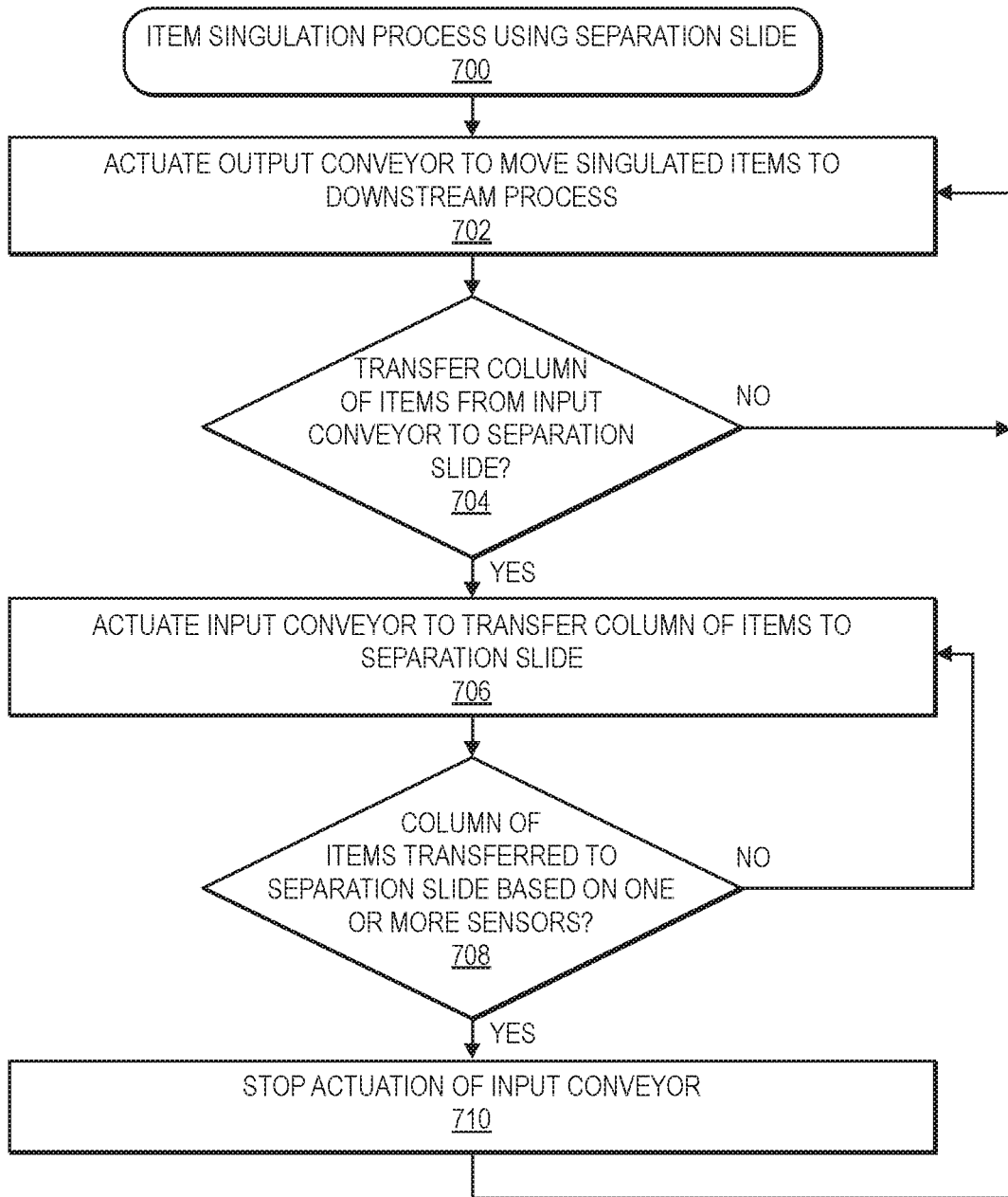
FIG. 7 is a flow diagram illustrating an example item singulation process using a separation slide, in accordance with implementations of the present disclosure.

FIG. 7 is a flow diagram illustrating an example item singulation process using a separation slide 700, in accordance with implementations of the present disclosure.

The process 700 may begin by actuating an output conveyor to move singulated items to a downstream process, as at 702. For example, one or more actuators of the output conveyor may cause rotation or movement of rollers, belts, or other conveyance mechanisms of the output conveyor to move or transfer singulated items on the output conveyor to one or more downstream processes. In addition, a controller may instruct actuation of the output conveyor to transfer singulated items to downstream processes.

The process 700 may then continue to determine whether to transfer a column of items from an input conveyor to a separation slide, as at 704. For example, if a transfer zone of the output conveyor, or the separation slide is empty, it may be determined that a column of items is to be transferred from the input conveyor to the separation slide. As described herein, one or more sensors, such as cameras, imaging sensors, imaging devices, depth sensors, infrared sensors, photoeyes, light curtains, proximity sensors, or other types of sensors, associated with the transfer zone of the output conveyor and/or the separation slide may detect the presence or absence of one or more items within the transfer zone of the output conveyor and/or on the separation slide, and/or feedback or data associated with actuators or other portions of the output conveyor, e.g., using data from motor or actuator encoders, data associated with times or durations of operation, and/or other data or measurements related to operational times or traveled distances of one or more objects on the output conveyor, may be processed to determine the presence or absence of one or more items within the transfer zone of the output conveyor and/or on the separation slide. In addition, a controller may receive data from one or more sensors or data or feedback from actuators or other portions of the output conveyor and/or the separation slide and determine whether to transfer a column of items from the input conveyor to the separation slide.

If it is determined that a column of items is not to be transferred to the separation slide, e.g., because one or more items is present within the transfer zone of the output conveyor or on the separation slide, and/or to alter or adjust a spacing of individual columns of items, then the process 700 may return to step 702 to continue to actuate the output conveyor to move singulated items to downstream processes.

If, however, it is determined that a column of items is to be transferred to the separation slide, e.g., because no items are present within the transfer zone of the output conveyor or on the separation slide, and/or following alteration or adjustment of spacing of individual columns of items, then the process 700 may proceed to actuate the input conveyor to transfer a column of items to the separation slide, as at 706. For example, the input conveyor may be actuated to move or transfer a column of items from the input conveyor to the separation slide. In addition, a controller may instruct actuation of the input conveyor to transfer a column of items to the separation slide.

The process 700 may then continue with determining whether the column of items is transferred to the separation slide based on one or more sensors, as at 708. For example, if the separation slide and/or a transfer zone of the output conveyor at which the output conveyor may receive individual columns of items has received one or more items, it may be determined that a column of items has been transferred from the input conveyor to the separation slide. As described herein, one or more sensors, such as cameras, imaging sensors, imaging devices, depth sensors, infrared sensors, photoeyes, light curtains, proximity sensors, or other types of sensors, associated with the transfer zone of the output conveyor and/or the separation slide may detect the presence or absence of one or more items within the transfer zone of the output conveyor and/or on the separation slide, and/or feedback or data associated with actuators or other portions of the output conveyor, e.g., using data from motor or actuator encoders, data associated with times or durations of operation, and/or other data or measurements related to operational times or traveled distances of one or more objects on the output conveyor, may be processed to determine the presence or absence of one or more items within the transfer zone of the output conveyor and/or on the separation slide. In addition, a controller may receive data from one or more sensors or data or feedback from actuators or other portions of the output conveyor and/or the separation slide and determine whether a column of items has been transferred from the input conveyor to the separation slide.

If it is determined that the column of items has not yet been transferred to the separation slide, then the process 700 may return to step 706 to continue to actuate the input conveyor to transfer a column of items to the separation slide.

If, however, it is determined that the column of items has been transferred to the separation slide, then the process 700 may proceed with stopping actuation of the input conveyor, as at 710. For example, the input conveyor may be stopped responsive to transferring the column of items to the separation slide, in order to alter or adjust a spacing between individual columns of items as the columns are transferred to the separation slide and then the output conveyor. In addition, a controller may instruct stopping of actuation of the input conveyor responsive to transferring a column of items to the separation slide and then the output conveyor.

Then, the process 700 may return to step 702 to continue to actuate the output conveyor to move singulated items to downstream processes, and the process 700 may substantially repeat to continue to identify, separate, and singulate items using the example item singulation systems described herein.

FIG. 8 is a schematic, overhead view diagram of an example item singulation system 800 using a separation slide and a turn conveyor, in accordance with implementations of the present disclosure.

As shown in FIG. 8, an example item singulation system 800 may include a combination of various features described herein. For example, the example item singulation system 800 may include an input conveyor 810, a separation slide 620, a turn conveyor 130, and an output conveyor 840. The input conveyor 810 may include any and all of the features of input conveyors 110, 410, 610 described herein at least with respect to FIGS. 1A-7, and the output conveyor 840 may include any and all of the features of output conveyors 140, 440, 640 described herein at least with respect to FIGS. 1A-7. In addition, the turn conveyor 130 may include any and all of the features of turn conveyors 130 described herein at least with respect to FIGS. 1A-3. Further, the separation slide 620 may include any and all of the features of separation slides 620 described herein at least with respect to FIGS. 6A-7. Moreover, the example item singulation system 800 may include any of the cameras, imaging sensors, imaging devices, photoeyes, light curtains, proximity sensors, or other types of sensors, as well as utilize feedback or data associated with actuators or other portions of the one or more conveyors, described herein at least with respect to FIGS. 1A-7 in order to control and coordinate actuations and operations of the example item singulation system to identify, separate, and singulate items for downstream processes.

In addition, the turn conveyor 130 may be configured to rotate items by a defined angle or amount between receipt of the items from the separation slide 620 and transfer of the items to the output conveyor 840. For example, the turn conveyor 130 may rotate items by approximately 90 degrees, such that a direction of movement of the output conveyor 840 is approximately parallel to a direction of movement of the input conveyor 810. In other example embodiments, the turn conveyor 130 may rotate items by different angles, e.g., approximately 30 degrees, approximately 45 degrees, approximately 60 degrees, or other angles or amounts.

Further, the operations of the example item singulation system 800 may be controlled substantially as a pull system, e.g., by a controller or control system as further described herein. For example, the output conveyor 840 may be actuated to transfer singulated items to various downstream processes. In addition, the output conveyor 840 may be selectively actuated to alter or adjust spacing between individual columns of items received from the turn conveyor 130. Upon determining that a column of items is to be transferred from the turn conveyor 130 to the output conveyor 840, e.g., to a transfer zone of the output conveyor 840 that is adjacent the turn conveyor 130, the turn conveyor 130 may be actuated to transfer a column of items to the transfer zone of the output conveyor 840.

Continuing with the operations of the example item singulation system 800 that may be controlled substantially as a pull system, upon determining that a column of items is to be transferred from the turn conveyor 130 to the output conveyor 840, e.g., to a transfer zone of the output conveyor 840 that is adjacent the turn conveyor 130, the input conveyor 810 may also be actuated with the turn conveyor 130 to transfer a column of items to the separation slide 620 and then to the turn conveyor 130 and the transfer zone of the output conveyor 840. Further, if it is determined that no objects are present on the separation slide 620, or that no objects are present on either of the turn conveyor 130 or the separation slide 620, the input conveyor 810 may be actuated to transfer a column of items from the input conveyor 810 to the separation slide 620, which column of items will subsequently be transferred to the turn conveyor 130 and the transfer zone of the output conveyor 840. After transferring the column of items from the input conveyor 810 to the separation slide 620, the input conveyor 810 may be stopped until it is subsequently determined that a next column of items is to be transferred from the input conveyor 810 to the separation slide 620, and subsequently to the turn conveyor 130 and the output conveyor 840.

By operating the example item singulation system substantially as a pull system, a substantially continuous, single file or line of items may be transferred to the output conveyor 840, by selective actuations of the output conveyor 840, turn conveyor 130, and/or input conveyor 810, e.g., using the separation slide 620, such that individual columns of items are identified, separated, and singulated for various downstream processes.

FIG. 9 is a schematic, overhead view diagram of an example item singulation system 900 using a separation conveyor or slide, a bidirectional conveyor segment, and two orthogonal conveyors, in accordance with implementations of the present disclosure.

As shown in FIG. 9, an example item singulation system 900 may include a combination of various features described herein. For example, the example item singulation system 900 may include an input conveyor 910, a separation conveyor or slide 120, 420, 620, a bidirectional conveyor segment 935, and two output conveyors 940. The input conveyor 910 may include any and all of the features of input conveyors 110, 410, 610 described herein at least with respect to FIGS. 1A-7, and the two output conveyors 940-1, 940-2 may include any and all of the features of output conveyors 140, 440, 640 described herein at least with respect to FIGS. 1A-7. In addition, the separation conveyors 120, 420 may include any and all of the features of separation conveyors 120, 420 described herein at least with respect to FIGS. 1A-5. Further, the separation slide 620 may include any and all of the features of separation slides 620 described herein at least with respect to FIGS. 6A-7. Moreover, the example item singulation system 900 may include any of the cameras, imaging sensors, imaging devices, photoeyes, light curtains, proximity sensors, or other types of sensors, as well as utilize feedback or data associated with actuators or other portions of the one or more conveyors, described herein at least with respect to FIGS. 1A-7 in order to control and coordinate actuations and operations of the example item singulation system to identify, separate, and singulate items for downstream processes.

The bidirectional conveyor segment 935 may comprise a frame and one or more rollers, belts, or other conveyance mechanisms that may be selectively controlled or actuated to move or transfer items in two different directions. In example embodiments, the bidirectional conveyor segment 935 may be configured to move or actuate in two opposite directions. As shown in FIG. 9, the bidirectional conveyor segment 935 may be configured to actuate and transfer items either toward a first output conveyor 940-1 or toward a second output conveyor 940-2. In this manner, individual columns of items may be selectively moved, transferred, and/or sorted to either of the two different output conveyors 940-1, 940-2 as desired, which may lead to various downstream processes.

In addition, the output conveyors 940 may be oriented in positions that are rotated approximately 90 degrees relative the input conveyor 910, such that directions of movement of the output conveyors 940 are approximately orthogonal to a direction of movement of the input conveyor 910. In other example embodiments, the output conveyors 940 may be oriented in positions that are rotated by different amounts or angles relative to the input conveyor 910, e.g., approximately 45 degrees, approximately 60 degrees, approximately 75 degrees, or other angles or amounts.

Further, the operations of the example item singulation system 900 may be controlled substantially as a pull system, e.g., by a controller or control system as further described herein. For example, one or both of the output conveyors 940 may be actuated to transfer singulated items to various downstream processes. In addition, the output conveyors 940 may be selectively actuated to alter or adjust spacing between individual columns of items received from the bidirectional conveyor segment 935. Upon determining that a column of items is to be transferred from the bidirectional conveyor segment 935 to one of the output conveyors 940, e.g., to a transfer zone of one of the output conveyors 940 that is adjacent the bidirectional conveyor segment 935, the bidirectional conveyor segment 935 may be actuated to transfer a column of items to the transfer zone of one of the output conveyors 940.

Continuing with the operations of the example item singulation system 900 that may be controlled substantially as a pull system, upon determining that a column of items is to be transferred from the bidirectional conveyor segment 935 to one of the output conveyors 940, e.g., to a transfer zone of one of the output conveyors 940 that is adjacent the bidirectional conveyor segment 935, the input conveyor 910 and/or separation conveyor 120, 420 may also be actuated with the bidirectional conveyor segment 935 to transfer a column of items to the separation conveyor or slide 120, 420, 620 and then to the bidirectional conveyor segment 935 and the transfer zone of one of the output conveyors 940. Further, if it is determined that no objects are present on the separation conveyor or slide 120, 420, 620, or that no objects are present on either of the bidirectional conveyor segment 935 or the separation conveyor or slide 120, 420, 620, the input conveyor 910 may be actuated to transfer a column of items from the input conveyor 910 to the separation conveyor or slide 120, 420, 620, which column of items will subsequently be transferred to the bidirectional conveyor segment 935 and the transfer zone of one of the output conveyors 940. After transferring the column of items from the input conveyor 910 to the separation conveyor or slide 120, 420, 620, the input conveyor 910 may be stopped until it is subsequently determined that a next column of items is to be transferred from the input conveyor 910 to the separation conveyor or slide 120, 420, 620, and subsequently to the bidirectional conveyor segment 935 and one of the output conveyors 940.

By operating the example item singulation system substantially as a pull system, a substantially continuous, single file or line of items may be transferred to each of the output conveyors 940, by selective actuations of the output conveyors 940, bidirectional conveyor segment 935, separation conveyors 120, 420 (or alternatively using a separation slide 620), and/or input conveyor 910, such that individual columns of items are identified, separated, and singulated for various downstream processes.

Figure 10:
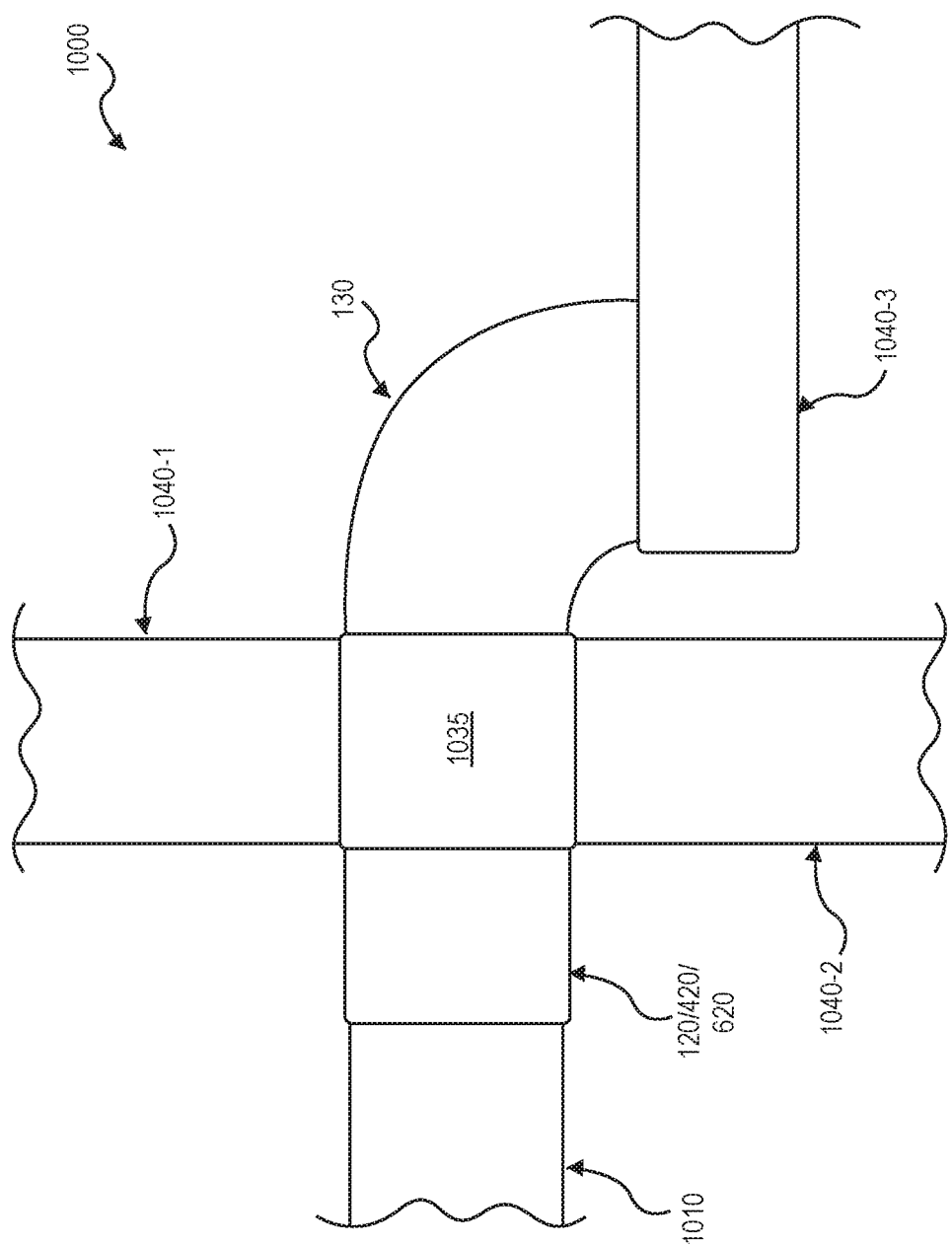
FIG. 10 is a schematic, overhead view diagram of an example item singulation system using a separation conveyor or slide, an omnidirectional conveyor segment, two orthogonal conveyors, and a turn conveyor, in accordance with implementations of the present disclosure.

FIG. 10 is a schematic, overhead view diagram of an example item singulation system 1000 using a separation conveyor or slide, an omnidirectional conveyor segment, two orthogonal conveyors, and a turn conveyor, in accordance with implementations of the present disclosure.

As shown in FIG. 10, an example item singulation system 1000 may include a combination of various features described herein. For example, the example item singulation system 1000 may include an input conveyor 1010, a separation conveyor or slide 120, 420, 620, an omnidirectional conveyor segment 1035, a turn conveyor 130, and three output conveyors 1040. The input conveyor 1010 may include any and all of the features of input conveyors 110, 410, 610 described herein at least with respect to FIGS. 1A-7, and the three output conveyors 1040-1, 1040-2, 1040-3 may include any and all of the features of output conveyors 140, 440, 640 described herein at least with respect to FIGS. 1A-7. In addition, the separation conveyors 120, 420 may include any and all of the features of separation conveyors 120, 420 described herein at least with respect to FIGS. 1A-5, and the separation slide 620 may include any and all of the features of separation slides 620 described herein at least with respect to FIGS. 6A-7. Further, the turn conveyor 130 may include any and all of the features of turn conveyors 130 described herein at least with respect to FIGS. 1A-3. Moreover, the example item singulation system 1000 may include any of the cameras, imaging sensors, imaging devices, photoeyes, light curtains, proximity sensors, or other types of sensors, as well as utilize feedback or data associated with actuators or other portions of the one or more conveyors, described herein at least with respect to FIGS. 1A-7 in order to control and coordinate actuations and operations of the example item singulation system to identify, separate, and singulate items for downstream processes.

The omnidirectional conveyor segment 1035 may comprise a frame and one or more rollers, belts, or other conveyance mechanisms that may be selectively controlled or actuated to move or transfer items in at least three different directions, e.g., three, four, six, or more different directions. In example embodiments, the omnidirectional conveyor segment 1035 may be configured to move or actuate in at least three orthogonal directions. As shown in FIG. 10, the omnidirectional conveyor segment 1035 may be configured to actuate and transfer items either toward a first output conveyor 1040-1 or toward a second output conveyor 1040-2, as well as toward a turn conveyor 130 that leads to a third output conveyor 1040-3. In this manner, individual columns of items may be selectively moved, transferred, and/or sorted to any of the three different output conveyors 1040-1, 1040-2, 1040-3 as desired, which may lead to various downstream processes.

In addition, the output conveyors 1040-1, 1040-2 may be oriented in positions that are rotated approximately 90 degrees relative the input conveyor 1010, such that directions of movement of the output conveyors 1040-1, 1040-2 are approximately orthogonal to a direction of movement of the input conveyor 1010. In other example embodiments, the output conveyors 1040-1, 1040-2 may be oriented in positions that are rotated by different amounts or angles relative to the input conveyor 1010, e.g., approximately 45 degrees, approximately 60 degrees, approximately 75 degrees, or other angles or amounts.

Moreover, the turn conveyor 130 may be configured to rotate items by a defined angle or amount between receipt of the items from the omnidirectional conveyor segment 1035 and transfer of the items to the output conveyor 1040-3. For example, the turn conveyor 130 may rotate items by approximately 90 degrees, such that a direction of movement of the output conveyor 1040-3 is approximately parallel to a direction of movement of the input conveyor 1010. In other example embodiments, the turn conveyor 130 may rotate items by different angles, e.g., approximately 30 degrees, approximately 45 degrees, approximately 60 degrees, or other angles or amounts.

Further, the operations of the example item singulation system 1000 may be controlled substantially as a pull system, e.g., by a controller or control system as further described herein. For example, one or more of the output conveyors 1040 may be actuated to transfer singulated items to various downstream processes. In addition, the output conveyors 1040 may be selectively actuated to alter or adjust spacing between individual columns of items received from the omnidirectional conveyor segment 1035 and/or the turn conveyor 130. Upon determining that a column of items is to be transferred from the turn conveyor 130 to the output conveyor 1040-3, e.g., to a transfer zone of the output conveyor 1040-3 that is adjacent the turn conveyor 130, the turn conveyor 130 may be actuated to transfer a column of items to the transfer zone of the output conveyor 1040-3.

In addition, upon determining that a column of items is to be transferred from the omnidirectional conveyor segment 1035 to one of the output conveyors 1040, e.g., to a transfer zone of one of the output conveyors 1040-1, 1040-2 that is adjacent the omnidirectional conveyor segment 1035, or to the turn conveyor 130 and subsequently to the output conveyor 1040-3, the omnidirectional conveyor segment 1035 may be actuated to transfer a column of items to the transfer zone of one of the output conveyors 1040-1, 1040-2, or to the turn conveyor 130 and subsequently to the output conveyor 1040-3.

Continuing with the operations of the example item singulation system 1000 that may be controlled substantially as a pull system, upon determining that a column of items is to be transferred from the omnidirectional conveyor segment 1035 to one of the output conveyors 1040, e.g., to a transfer zone of one of the output conveyors 1040 that is adjacent the omnidirectional conveyor segment 1035, or to the turn conveyor 130, the input conveyor 1010 and/or separation conveyor 120, 420 may also be actuated with the omnidirectional conveyor segment 1035 to transfer a column of items to the separation conveyor or slide 120, 420, 620 and then to the omnidirectional conveyor segment 1035. Further, if it is determined that no objects are present on the separation conveyor or slide 120, 420, 620, that no objects are present on either of the omnidirectional conveyor segment 1035 or the separation conveyor or slide 120, 420, 620, or that no objects are present on any of the turn conveyor 130, the omnidirectional conveyor segment 1035, or the separation conveyor or slide 120, 420, 620, the input conveyor 1010 may be actuated to transfer a column of items from the input conveyor 1010 to the separation conveyor or slide 120, 420, 620, which column of items will subsequently be transferred to the omnidirectional conveyor segment 1035 and the transfer zone of one of the output conveyors 1040 or the turn conveyor 130. After transferring the column of items from the input conveyor 1010 to the separation conveyor or slide 120, 420, 620, the input conveyor 1010 may be stopped until it is subsequently determined that a next column of items is to be transferred from the input conveyor 1010 to the separation conveyor or slide 120, 420, 620, and subsequently to the omnidirectional conveyor segment 1035 and one of the output conveyors 1040 or the turn conveyor 130.

By operating the example item singulation system substantially as a pull system, a substantially continuous, single file or line of items may be transferred to each of the output conveyors 1040, by selective actuations of the output conveyors 1040, turn conveyor 130, omnidirectional conveyor segment 1035, separation conveyors 120, 420 (or alternatively using a separation slide 620), and/or input conveyor 1010, such that individual columns of items are identified, separated, and singulated for various downstream processes.

Figure 11:
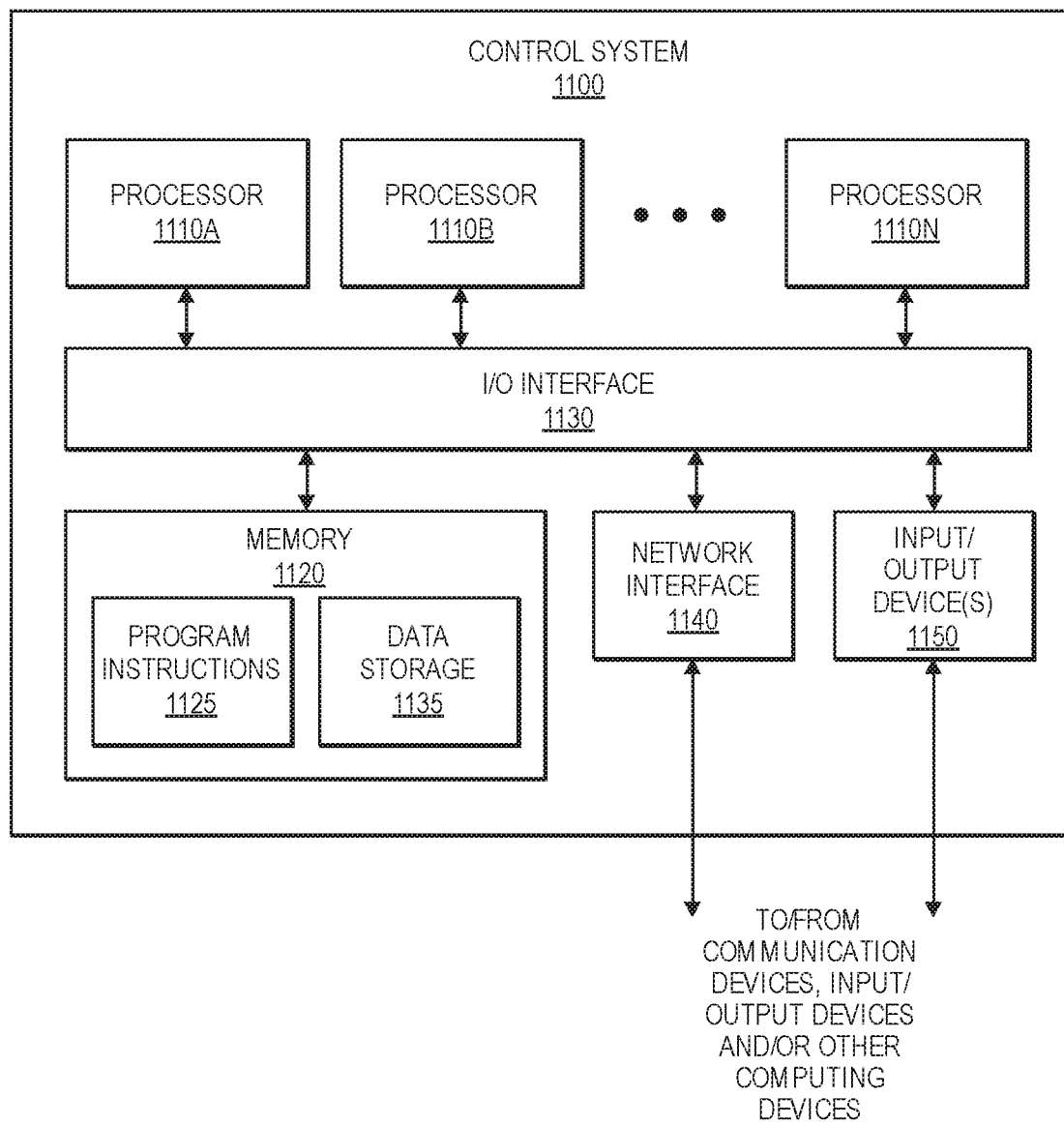
FIG. 11 is a block diagram illustrating an example control system, in accordance with implementations of the present disclosure.

FIG. 11 is a block diagram illustrating an example control system 1100, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. One such control system is illustrated by the block diagram in FIG. 11. In the illustrated implementation, a control system 1100 includes one or more processors 1110A, 1110B through 1110N, coupled to a non-transitory computer-readable storage medium 1120 via an input/output (I/O) interface 1130. The control system 1100 further includes a network interface 1140 coupled to the I/O interface 1130, and one or more input/output devices 1150. In some implementations, it is contemplated that a described implementation may be implemented using a single instance of the control system 1100 while, in other implementations, multiple such systems or multiple nodes making up the control system 1100 may be configured to host different portions or instances of the described implementations. For example, in one implementation, some data sources or services (e.g., related to portions of item singulation systems, operations, or processes, etc.) may be implemented via one or more nodes of the control system 1100 that are distinct from those nodes implementing other data sources or services (e.g., related to other portions of item singulation systems, operations, or processes, etc.).

In various implementations, the control system 1100 may be a uniprocessor system including one processor 1110A, or a multiprocessor system including several processors 1110A-1110N (e.g., two, four, eight, or another suitable number). The processors 1110A-1110N may be any suitable processor capable of executing instructions. For example, in various implementations, the processors 1110A-1110N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1110A-1110N may commonly, but not necessarily, implement the same ISA.

The non-transitory computer-readable storage medium 1120 may be configured to store executable instructions and/or data accessible by the one or more processors 1110A-1110N. In various implementations, the non-transitory computer-readable storage medium 1120 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1120 as program instructions 1125 and data storage 1135, respectively. In other implementations, program instructions and/or data may be received, sent or stored upon different types of computer-accessible media, such as non-transitory media, or on similar media separate from the non-transitory computer-readable storage medium 1120 or the control system 1100. Generally speaking, a non-transitory, computer-readable storage medium may include storage media or memory media such as magnetic or optical media, e.g., disk or CD/DVD-ROM, coupled to the control system 1100 via the I/O interface 1130. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1140.

In one implementation, the I/O interface 1130 may be configured to coordinate I/O traffic between the processors 1110A-1110N, the non-transitory computer-readable storage medium 1120, and any peripheral devices, including the network interface 1140 or other peripheral interfaces, such as input/output devices 1150. In some implementations, the I/O interface 1130 may perform any necessary protocol, timing or other data transformations to convert data signals from one component (e.g., non-transitory computer-readable storage medium 1120) into a format suitable for use by another component (e.g., processors 1110A-1110N). In some implementations, the I/O interface 1130 may include support for devices attached through various types of peripheral buses, such as a variant of the Peripheral Component Interconnect (PCI) bus standard or the Universal Serial Bus (USB) standard, for example. In some implementations, the function of the I/O interface 1130 may be split into two or more separate components, such as a north bridge and a south bridge, for example. Also, in some implementations, some or all of the functionality of the I/O interface 1130, such as an interface to the non-transitory computer-readable storage medium 1120, may be incorporated directly into the processors 1110A-1110N.

The network interface 1140 may be configured to allow data to be exchanged between the control system 1100 and other devices attached to a network, such as other control systems, material handling system controllers, warehouse management systems, other computer systems, various types of actuators, various types of sensors, various types of vision systems, imaging devices, or imaging sensors, upstream stations or processes, downstream stations or processes, other material handling systems or equipment, or between nodes of the control system 1100. In various implementations, the network interface 1140 may support communication via wired or wireless general data networks, such as any suitable type of Ethernet network.

Input/output devices 1150 may, in some implementations, include one or more displays, projection devices, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 1100. Multiple input/output devices 1150 may be present in the control system 1100 or may be distributed on various nodes of the control system 1100. In some implementations, similar input/output devices may be separate from the control system 1100 and may interact with one or more nodes of the control system 1100 through a wired or wireless connection, such as over the network interface 1140.

As shown in FIG. 11, the memory 1120 may include program instructions 1125 that may be configured to implement one or more of the described implementations and/or provide data storage 1135, which may comprise various tables, data stores and/or other data structures accessible by the program instructions 1125. The program instructions 1125 may include various executable instructions, programs, or applications to facilitate item singulation operations and processes described herein, such as conveyance mechanism, machine, or apparatus controllers, drivers, or applications, actuator controllers, drivers, or applications, sensor controllers, drivers, or applications, sensor data processing applications, vision system or imaging device controllers, drivers, or applications, imaging data processing applications, material handling equipment controllers, drivers, or applications, upstream station controllers, drivers, or applications, downstream station controllers, drivers, or applications, etc. The data storage 1135 may include various data stores for maintaining data related to systems, operations, or processes described herein, such as conveyance mechanisms, machines, or apparatus, actuators, actuator data, sensors, sensor data, vision systems or imaging devices, imaging data, items, packages, containers, or objects, item, package, container, or object data, leading edge data, trailing edge data, item column data, material handling equipment or apparatus, upstream systems, stations, or processes, downstream systems, stations, or processes, etc.

Those skilled in the art will appreciate that the control system 1100 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1100 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 2, 3, 5, and 7, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An item singulation system, comprising:
   an input conveyor configured to receive a plurality of items;
   a vision system configured to determine a column of items on the input conveyor;
   a separation conveyor configured to receive the column of items from the input conveyor;
   a turn conveyor configured to receive the column of items from the separation conveyor, the turn conveyor configured to rotate the column of items approximately ninety degrees;
   an output conveyor configured to receive the column of items from the turn conveyor; and
   a controller in communication with the input conveyor, the vision system, the separation conveyor, the turn conveyor, and the output conveyor, the controller configured to at least:
   receive imaging data from the vision system;
   determine the column of items on the input conveyor based at least in part on the imaging data; and
   instruct actuations of the input conveyor, the separation conveyor, the turn conveyor, and the output conveyor to transfer the column of items from the input conveyor to the output conveyor.

2. The item singulation system of claim 1, wherein the controller is further configured to at least:
   instruct the input conveyor and the separation conveyor to actuate at a first speed to transfer the column of items from the input conveyor to the separation conveyor.

3. The item singulation system of claim 2, wherein the controller is further configured to at least:
   instruct the separation conveyor and the turn conveyor to actuate at a second speed to transfer the column of items from the separation conveyor to the turn conveyor.

4. The item singulation system of claim 3, wherein the controller is further configured to at least:
   instruct the turn conveyor to actuate at the second speed, and instruct the output conveyor to stop to transfer the column of items from the turn conveyor to the output conveyor.

5. The item singulation system of claim 1, wherein a direction of movement of the input conveyor is parallel to a direction of movement of the output conveyor.

6. A system, comprising:
   an input conveyor configured to receive a plurality of items;
   a vision system configured to determine a column of items on the input conveyor;
   a separation conveyor configured to receive the column of items from the input conveyor;
   a turn conveyor configured to receive the column of items from the separation conveyor, the turn conveyor configured to rotate the column of items to extend along a direction of movement of an output conveyor; and
   the output conveyor configured to receive the column of items from the turn conveyor.

7. The system of claim 6, wherein the input conveyor and the separation conveyor rotate at a first speed to transfer the column of items from the input conveyor to the separation conveyor.

8. The system of claim 7, wherein the separation conveyor and the turn conveyor rotate at a second speed to transfer the column of items from the separation conveyor to the turn conveyor.

9. The system of claim 8, wherein the turn conveyor rotates at the second speed, and the output conveyor rotates at a third speed to transfer the column of items from the turn conveyor to the output conveyor.

10. The system of claim 6, further comprising:
a controller configured to at least:
receive imaging data from the vision system; and
determine the column of items on the input conveyor based at least in part on the imaging data.

11. The system of claim 10, wherein the controller is further configured to at least:
determine a first leading edge of a first item of the plurality of items relative to a direction of movement of the input conveyor based at least in part on the imaging data;
responsive to determining the first leading edge of the first item, determine a first trailing edge of a second item of the plurality of items relative to the direction of movement of the input conveyor based at least in part on the imaging data; and
determine the column of items on the input conveyor based at least in part on the first leading edge of the first item and the first trailing edge of the second item.

12. The system of claim 11, further comprising:
at least one sensor configured to detect items within a transfer zone of the output conveyor;
wherein the controller is further configured to at least:
determine, based on data from the at least one sensor, that no items are present within the transfer zone of the output conveyor; and
responsive to determining that no items are present within the transfer zone of the output conveyor, instruct the turn conveyor and the separation conveyor to actuate at a same speed to transfer the column of items to the transfer zone of the output conveyor.

13. The system of claim 12,
wherein the controller is further configured to at least:
determine, based on data from the at least one sensor, that the column of items is present within the transfer zone of the output conveyor; and
responsive to determining that the column of items is present within the transfer zone of the output conveyor, instruct the turn conveyor and the separation conveyor to stop.

14. The system of claim 12,
wherein the controller is further configured to at least:
determine that no items are present on the separation conveyor; and
responsive to determining that no items are present on the separation conveyor, instruct the input conveyor and the separation conveyor to actuate to transfer the column of items from the input conveyor to the separation conveyor.

15. The system of claim 14,
wherein the controller is further configured to at least:
instruct the input conveyor and the separation conveyor to actuate at a same speed to transfer the column of items from the input conveyor to the separation conveyor; and
instruct the input conveyor to stop responsive to transferring the first trailing edge of the second item from the input conveyor to the separation conveyor.

16. The system of claim 6, wherein the separation conveyor comprises a separation slide configured to receive the column of items from the input conveyor and configured to transfer the column of items to the turn conveyor.

17. A computer-implemented method, comprising:
receiving, by a controller, imaging data from a vision system associated with an input conveyor;
determining, by the controller, a column of items on the input conveyor based at least in part on the imaging data;
causing transfer, by the controller, of the column of items from the input conveyor to a separation conveyor;
causing transfer, by the controller, of the column of items from the separation conveyor to a turn conveyor, the turn conveyor configured to rotate the column of items to extend along a direction of movement of an output conveyor; and
causing transfer, by the controller, of the column of items from the turn conveyor to the output conveyor.

18. The computer-implemented method of claim 17, wherein determining the column of items on the input conveyor further comprises:
determining, by the controller, a first leading edge of a first item of a plurality of items on the input conveyor relative to a direction of movement of the input conveyor based at least in part on the imaging data;
responsive to determining the first leading edge of the first item, determining, by the controller, a first trailing edge of a second item of the plurality of items on the input conveyor relative to the direction of movement of the input conveyor based at least in part on the imaging data; and
determining, by the controller, the column of items on the input conveyor based at least in part on the first leading edge of the first item and the first trailing edge of the second item.

19. The computer-implemented method of claim 17, wherein causing transfer, by the controller, of the column of items from the turn conveyor to the output conveyor further comprises:
determining, by the controller, that the column of items is to be transferred to a transfer zone of the output conveyor; and
responsive to determining that the column of items is to be transferred, instructing, by the controller, the turn conveyor and the separation conveyor to actuate at a same speed to transfer the column of items to the transfer zone of the output conveyor.

20. The computer-implemented method of claim 17, wherein causing transfer, by the controller, of the column of items from the input conveyor to the separation conveyor further comprises:
determining, by the controller, that the column of items is to be transferred to the separation conveyor; and responsive to determining that the column of items is to be transferred, instructing, by the controller, the input conveyor and the separation conveyor to actuate at a same speed to transfer the column of items from the input conveyor to the separation conveyor.

* * * * *